United States Patent
Rick et al.

(10) Patent No.: US 7,308,022 B2
(45) Date of Patent: Dec. 11, 2007

(54) PARAMETER ESTIMATOR CONFIGURED TO DISTINGUISH BETWEEN PEAKS AND SIDELOBES OF CORRELATION FUNCTION

(76) Inventors: Roland R. Rick, 11456 Northwick Way, San Diego, CA (US) 92131;
Messay Amerga, 8929 Lombard Pl., Appt #119, San Diego, CA (US) 92122;
Jeremy M. Stein, 19 Na'amat Street, Haifa 34670 (IL); Ivan Fernandez-Corbaton, 1134 Felspar St., San Diego, CA (US) 92109

( * ) Notice: Subject to any disclaimer, the term of this patent is extended or adjusted under 35 U.S.C. 154(b) by 765 days.

(21) Appl. No.: 10/060,885

(22) Filed: Jan. 29, 2002

(65) Prior Publication Data
US 2003/0081662 A1    May 1, 2003

Related U.S. Application Data

(60) Provisional application No. 60/340,100, filed on Nov. 1, 2001.

(51) Int. Cl.
*H04B 1/00* (2006.01)
(52) U.S. Cl. .................. 375/150; 375/142; 375/148; 375/152; 375/285; 375/343; 375/346
(58) Field of Classification Search ................ 375/136, 375/142, 143, 147, 148, 150, 343, 152, 285, 375/346
See application file for complete search history.

(56) References Cited

U.S. PATENT DOCUMENTS 6,229,842 B1   5/2001  Schulist et al. ............. 375/148
6,738,438 B2 * 5/2004  Rick et al. .................. 375/343
6,836,518 B1 * 12/2004 Sano et al. .................. 375/343
2003/0072356 A1 * 4/2003 Abraham et al. ........... 375/148

FOREIGN PATENT DOCUMENTS

WO        0054424        9/2000

OTHER PUBLICATIONS

Jari Iinatti, "DS Code Acquisition in Slowly Fading Multi-path Channel", IEEE—University of Oulu, Telecommunication Laboratory, 2000, pp. 2408-2413.

(Continued)

*Primary Examiner*—Ted Wang
(74) *Attorney, Agent, or Firm*—Thomas Rouse; Bruce Greenhaus; Andrea Mays

(57) ABSTRACT

A parameter estimator for estimating one or more parameter(s) from a signal is described. A correlation function is derived from the signal, and the correlation function analyzed to determine if one or more first peak(s) are present, and, if so, distinguishable from the sidelobe(s) of a second peak. If the one or more first peak(s) are present and distinguishable from the sidelobe(s) of the second peak, the one or more parameter(s) are estimated from the one or more first peak(s). If the one or more first peak(s) are not present, or, if present, are not distinguishable from the sidelobe(s) of the second peak, the one or more parameter(s) are estimated from the second peak. The parameter estimator may be employed in a subscriber station to estimate a parameter such as the time of arrival of one or more base station or sector pilot signals in a wireless communication system. This information may be utilized in an overall advanced forward link trilateration (AFLT) process for estimating the location of the subscriber station.

50 Claims, 15 Drawing Sheets

OTHER PUBLICATIONS

Bar-David, et al., "Barker Code Position Modulation for High-Rate Communication in the ISM Bands", Bell Lbas Technical Journal, Autumn 1996, pp. 21-40.

Jari Iinatti, "On the Threshold Setting Principles in Code Acquistion of DS-SS Signals", IEEE Journal on Selected Areas in Communications, vol. 18, No. 1, Jan. 2000, pp. 62-72.

* cited by examiner

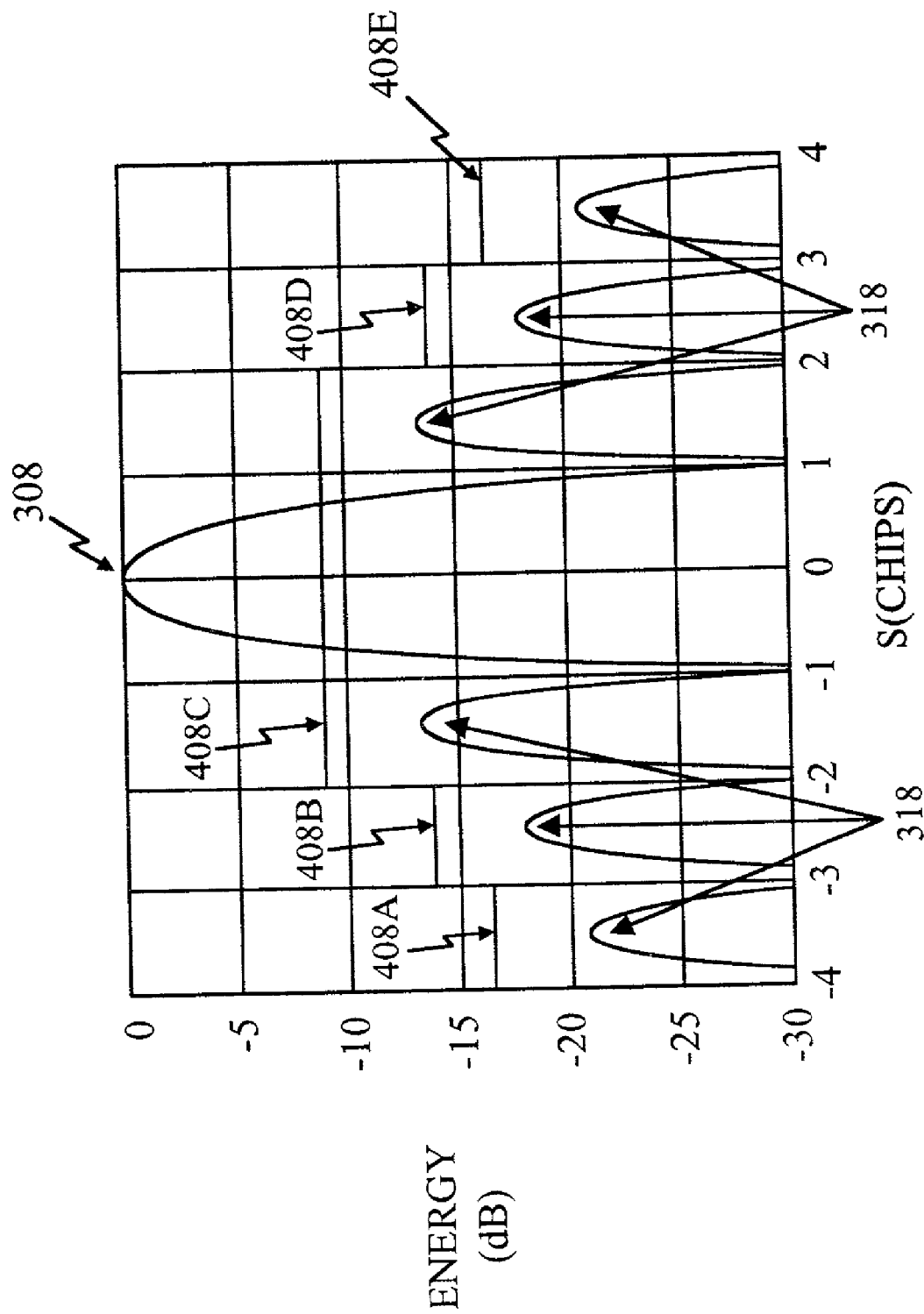

PARAMETER ESTIMATOR CONFIGURED TO DISTINGUISH BETWEEN PEAKS AND SIDELOBES OF CORRELATION FUNCTION

RELATED APPLICATIONS

This application claims priority to U.S. Provisional Application No. 60/340,100 filed Nov. 1, 2001.

FIELD OF THE INVENTION

This invention relates to the field of parameter estimation using correlation analysis, and more specifically, to a parameter estimator employing correlation analysis for estimating parameter(s) of signals subject to distortions caused by factors such as multi-path.

RELATED ART

The Global Positioning System (GPS) is a collection of satellites each of which travels in a precise orbit above the earth's surface. Each satellite transmits a signal modulated with a pseudo-noise (PN) code unique to the satellite. Each PN code comprises a predetermined number of chips. A GPS receiver receives a composite signal comprising a mixture of signals from each of the satellites that are visible to the receiver. A signal detector in the receiver detects a transmission from a particular satellite by determining the degree of correlation between the received signal and shifted versions of the PN code for that satellite. If a peak of sufficient quality in the correlation value for one of the shift offsets is detected, the receiver is considered to have detected the transmission from the satellite.

The receiver estimates its location by detecting transmissions from at least four of the satellites. For each detected transmission, the receiver uses the shift in the PN code to estimate the delay (in terms of chips or fractions of chips) between time of transmission and time of arrival. Given the known velocity of the transmission, the receiver estimates the distance between itself and the satellite. This estimated distance defines a sphere around the satellite. The receiver knows the precise orbits and positions of each of the satellites, and continuously receives updates to these orbits and positions. From this information, the receiver is able to determine its position (and the current time) from the point where the spheres for the four satellites intersect.

The FCC has mandated that subscriber stations, including but not limited to mobile stations, in wireless communications systems be capable of estimating their locations in order to promote rapid responses to 911 and other emergency calls. In response to this mandate, efforts are underway to equip subscriber stations with the means to estimate their locations from GPS satellite transmissions. Moreover, since base stations or sectors in wireless communications systems transmit pilot signals modulated with unique PN codes, these efforts also include allowing subscriber stations to estimate their locations from the transmissions of multiple base stations or sectors, or combinations of base stations or sectors and GPS satellites.

A signal detector in a GPS receiver attempts to detect the transmission of a satellite from the peak of a correlation function which is derived by multiplying the received signal (which is typically a composite signal comprising a mixture of the transmissions from multiple satellites) with shifted versions of the PN code for the satellite within a range defined by a predetermined search window, and then, for each shifted PN code, adding the multiplied values over a predetermined integration time to achieve a value representative of the degree of correlation between the received signal and the shifted PN code. If the peak is detected, the signal detector may then estimate one or more parameters, such as time of arrival, from the peak.

However, such a detector is not generally effective for the purpose of estimating parameters such as time of arrival from base station (or base station sector) transmissions since, unlike the transmissions from GPS satellites, the transmissions from the base stations or sectors are subject to more severe distortions caused by multi-path and lack of line of sight. These distortions typically cause multiple versions of a signal from a base station or sector to appear at the detector, which in turn introduce multiple peaks of varying amplitude into the correlation function for the signal. In many cases, the peak corresponding to a line of sight transmission will be weaker than a later peak representing a multi-path arrival. Therefore, the detector for estimating parameters such as time of arrival from base station (or base station sector) transmissions must be more focused on detecting earlier weaker received multipath. At the same time, the correlation functions derived from CDMA signals typically have sidelobes of the main peak that are much larger than those experienced with GPS signals. The detection of these sidelobes as earlier received peaks can cause a significant degradation in the position accuracy. Since the GPS detector is typically not concerned with large sidelobes of the main peak, it is generally unable to accurately estimate certain parameters such as time of arrival from base station or sector transmissions which require the ability to detect the earliest non-sidelobe peak.

Consider, for example, a subscriber station which erroneously reports a sidelobe as a main peak. This can introduce a range error of at least 360 meters into the position estimate of the subscriber station which is unacceptable given that the FCC has mandated an accuracy of ±150 meters 95% of the time, and an accuracy of ±50 meters 67% of the time.

RELATED APPLICATIONS

The present application is related to U.S. patent application Ser. Nos. 10/057,689 filed Jan. 24, 2002; 10/056,877 filed Jan. 24, 2002 and issued as U.S. Pat. No. 6,738,438; and 10/125,182, filed on Apr. 17, 2002, and owned in common by the assignee hereof. These applications are each fully incorporated by reference herein as though set forth in full.

SUMMARY

The invention provides a parameter estimator for estimating one or more parameter(s) of a signal through correlation analysis. The parameter estimator comprises correlation logic and analysis logic. The correlation logic is configured to derive a correlation function from the signal representing the correlation between the signal and shifted versions of an identification code. The analysis logic is configured to then analyze the correlation function, including detecting whether one or more first peak(s) are present, and if so, determining whether the one or more first peak(s) are distinguishable from one or more sidelobe(s) of a second peak. If the one or more first peak(s) are determined to be present and distinguishable from the sidelobe(s) of the second peak, the analysis logic is configured to then estimate the one or more parameter(s) responsive to the one or more first peak(s). If the one or more first peak(s) are not present or, if present, are not distinguishable from the sidelobe(s) of the second peak, the analysis logic is configured to then estimate the one or more parameter(s) responsive to the second peak. The signal may be a standalone signal or part of a composite signal comprising multiple signals. The second peak may be the strongest (i.e., main) peak, and the one or more first peak may be weaker peak(s) earlier in time than the strongest peak. Examples of the parameter(s) which may be estimated include, but are not limited to, time of arrival (TOA), root mean squared error (RMSE) for the TOA estimate, energy per chip ($E_c$) divided by total received power ($I_0$), etc.

In one embodiment, the analysis logic is configured to determine whether the one or more first peaks(s) are distinguishable from the sidelobe(s) of the second peak based on a priori knowledge regarding the correlation function. In particular, the shape, amplitude, or phase, or any combination thereof, of a component pulse of the correlation function corresponding to an independent arrival is known. For purposes of this disclosure, an "independent" arrival includes one of multiple signals from different sources which arrive at a destination as well as one of multiple renderings of the same signal which arrive at a destination through different routes. Based on this information, the analysis logic determines whether the one or more first peak(s) are distinguishable from the sidelobe(s) of the second peak.

In a second embodiment, the analysis logic is configured to determine whether the one or more first peak(s) are distinguishable from the sidelobe(s) of the second peak using a threshold. If the energy of the one or more first peak(s) equals or exceeds the threshold, they are considered to be distinguishable from the sidelobe(s) of the selected peak.

In general, the threshold T may be a variable which is dependent on one or more of $E_1$, the energy of a first peak, $E_2$, the energy of the second peak, $h(t_1-t_2)$, the expected shape, amplitude, or phase, or any combination thereof, of a component pulse of the correlation function corresponding to an independent arrival (which is centered at the second peak) at the time $t_1$ of the first peak, and I, the integration time. (In one implementation, the integration time I may comprise two components, N, the coherent integration time, and M, the number of coherent integrations which are non-coherently combined.). Dependent on one or more of these variables, the threshold may be set to limit the false alarm probability, i.e., the probability that a sidelobe of the second peak will be erroneously reported as the first peak, to a predetermined level, e.g., 0.1%, or below. If the energy $E_1$ of the first peak equals or exceeds the threshold, the first peak is considered to be distinguishable from the sidelobe(s) of the second peak. In one example, this condition can be expressed as follows:

$$E_1 \geq T(E_1, E_2, h(t_1-t_2), I)$$

In one implementation, a noise floor, $\gamma$, is determined which is dependent on the integration time I. If the energy of the first peak, $E_1$, is within a predetermined range $\Delta$ of the energy of the second peak $E_2$, and equals or exceeds the noise floor, the first peak is considered to be distinguishable from the sidelobe(s) of the second peak. In this implementation, the threshold T may be expressed as:

$$T = \max(E_2-\Delta, \gamma(I))$$

In a second implementation, a noise floor, $\gamma$, is determined which is dependent on the integration time I, and the difference (or absolute value of the difference) between the energy of the second peak $E_2$ and the energy of the first peak $E_1$. The noise floor, $\gamma$, in this implementation may be expressed either as $\gamma(E_2-E_1, I)$ or as $\gamma(|E_2-E_1|, I)$. The threshold T in this implementation is simply the noise floor $\gamma$.

In one example of this implementation, a first noise floor/threshold is employed if the energy of the first peak $E_1$ is within a first range $\Delta_1$, e.g., 6 dB, of the energy of the second peak $E_2$, and a second stricter noise floor/threshold is employed if the energy of the first peak $E_1$ is within a second range $\Delta_2$, e.g., 9 dB, of the energy of the second peak $E_2$. In this example, the first peak is considered to be distinguishable from the sidelobe(s) of the second peak if (1) the energy of the first peak $E_1$ equals or exceeds the first noise floor and is within $\Delta_1$ of $E_2$ or (2) the energy of the first peak $E_1$ equals or exceeds the second noise floor and is within $\Delta_2$ of $E_2$. This example may be readily extended to situations involving more than two noise floors.

In a third implementation, the threshold is dependent on the time difference between the first and second peaks. For example, the threshold may be reduced as the amplitude of the sidelobes of the second peak decreases.

The invention also provides a method of estimating one or more parameter(s) of a signal. The method begins with the step of deriving a correlation function from a signal. It then proceeds to determining whether one or more first peak(s) are present, and if so, whether they are distinguishable from sidelobe(s) of a second peak. If the one or more first peak(s) are present and distinguishable from the sidelobe(s) of the second peak, the method proceeds to estimating the one or more parameter(s) responsive to the one or more first peak(s). If the one or more first peak(s) are not present, or, if present, are not distinguishable from the sidelobe(s) of the second peak, the method proceeds to estimating the one or more parameter(s) responsive to the second peak.

In one embodiment, the method employs a threshold to determine whether the one or more first peaks(s) are distinguishable from the sidelobe(s) of the second peak. The threshold may be a variable dependent on one or more of $E_1$, $E_2$, the shape, phase or amplitude, or any combination thereof, of $h(t_1-t_2)$, and I, as described above.

In one implementation, the method employs a noise floor $\gamma$ which is dependent on the integration time I. If the energy of a first peak $E_1$ exceeds the noise floor $\gamma(I)$, and is within a predefined range $\Delta$ of the energy of the second peak $E_2$, the first peak is considered to be distinguishable from the sidelobe(s) of the second peak. In this implementation, the threshold T may be expressed as:

$$\max(E_2-\Delta, \gamma(I))$$

In a second implementation, the method employs a noise floor $\gamma$ which is a function of the integration time I and also $E_2-E_1$ (or the absolute value of $E_2-E_1$). In this implementation, the threshold T which is employed is simply the noise floor. In one example of this implementation, the method employs a first noise floor/threshold if the energy of the first peak $E_1$ is within a first range $\Delta_1$, e.g., 6 dB, of the energy of the second peak $E_2$, and employs a second, stricter noise floor/threshold if the energy of the first peak $E_1$ is within a second more relaxed range $\Delta_2$, e.g., 9 dB, of the energy of the second peak $E_2$. This example may be readily extended to situations involving more than two noise floors.

In a third implementation, the threshold is dependent on the difference between the time of the first and second peaks. For example, the threshold may decrease as the amplitude of the sidelobes of the second peak decreases.

Note that, in the foregoing embodiments, implementations, and examples, it is assumed that the energies are expressed in dB, but it should be appreciated that the invention also covers the case where the energies are expressed in linear terms, and that these embodiments, implementations, and examples may be readily extended to the linear case by re-expressing differences as ratios or multiplications.

For example, the expression T=max ($E_2-\Delta, \gamma(I)$) may be reformulated to cover the linear case as follows: T=max ($E_2 \cdot f, \gamma(I)$), where f is a suitable fraction or percentage. Similarly, the expression $\gamma(E_2-E_1, I)$ for the noise floor $\gamma$ may be reformulated for the linear case as follows: $\gamma(E_1/E_2, I)$. Finally, the example in which a first noise floor/threshold is utilized if the energy of the first peak $E_1$ is within a first range $\Delta_1$, e.g., 6 dB, of the energy of the second peak $E_2$, and a second, stricter noise floor/threshold is utilized if the energy of the first peak $E_1$ is within a second more relaxed range $\Delta_2$, e.g., 9 dB, of the energy of the second peak $E_2$, may be re-expressed in terms of using the first noise floor/threshold if the ratio of the energy of the first peak $E_1$ to the energy of the second peak $E_2$ equals or exceeds a first fraction or percentage $f_1$, and using the second, stricter noise floor/threshold if the ratio of the energy of the first peak $E_1$ to the energy of the second peak $E_2$ equals or exceeds a second smaller fraction or percentage $f_2$.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

FIG. 4C illustrates an implementation of the invention employing a time dependent threshold to distinguish a first peak from sidelobe(s) of the second peak;

DETAILED DESCRIPTION

Example Application

Figure 1:
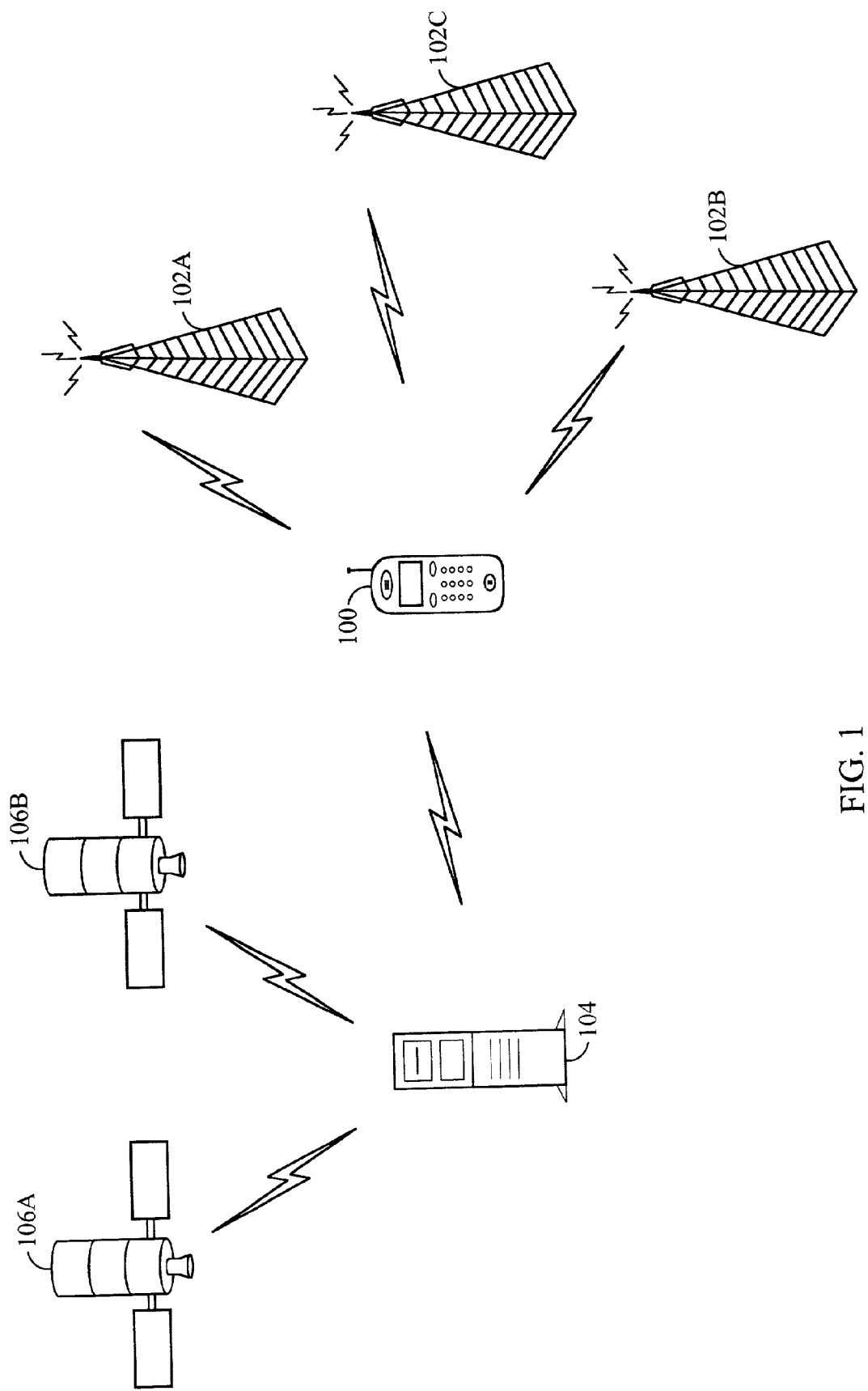
FIG. 1 is an example application of a parameter estimator according to the invention.

Referring to FIG. 1, an example application of a parameter estimator according to the invention is illustrated. In this example application, the parameter estimator is employed within subscriber station 100 for the purpose of estimating its location. The subscriber station 100 is a component of a wireless communication system such as but not limited to cellular, fixed wireless, PCS, and satellite communications systems. Moreover, the wireless communications system may provide for multiple access in accordance with CDMA, TDMA, FDMA, or GSM multiple access protocols, or combinations thereof.

One or more base station(s) or sector(s) 102a, 102b, and 102c are employed in the wireless communications system. Each base station or sector 102a, 102b, 102c transmits a pilot signal which is modulated with a repeating pseudo-random noise (PN) code which uniquely identifies that base station or sector. For IS-95 compliant CDMA systems, the PN code is a sequence of 32,768 chips which is repeated every 26.67 mSec.

One or more GPS satellites 106a, 106b may also be visible to the subscriber station 100 or position determination entity (PDE) 104. Each of the GPS satellites also transmits a signal which is modulated with a repeating PN code which uniquely identifies that satellite. In current GPS systems, the PN code is a sequence of 1,023 chips which is repeated every millisecond.

The parameter estimator within subscriber station 100 is configured to estimate various parameters of the pilot signals transmitted from the base stations or sectors 102a, 102b, and 102c and/or the signals transmitted from the GPS satellites 106a, 106b. Such parameters may include TOA, time of transmission, energy per chip divided by total received power ($E_c/I_0$), root mean squared error (RMSE) associated with the TOA estimate, etc.

These parameters, once estimated, are provided to PDE 104 which estimates the location of subscriber station 100 responsive thereto. (The PDE 104 may be a sever in a public computer network such as the Internet or other TCP/IP network, a private network, or some other network.) Once estimated, the position of the subscriber station 100 is downloaded to it so that it is available from the subscriber station 100 in the event of a 911 or other emergency call.

The PDE 104 may estimate the location of the subscriber station 100 from the measurements relating to the base stations or sectors 102a, 102b, and 102c, or, to increase accuracy, from the combined measurements of one or more of the base station(s) or sector(s) 102a, 102b, 102c and one or more of the GPS satellite(s) 106a, 106b.

The PDE 104 may provide other forms of assistance to the subscriber station 100. For example, PDE 104 may continuously track the GPS satellites, and provide assistance to the subscriber station 100 in locating the signals transmitted from the GPS satellites 106*a*, 106*b*. This avoids the need to have the subscriber station 100 undergo time-consuming "cold start" procedures for locating the satellites when it is powered up.

It should be appreciated that many other applications of the parameter estimator of the invention are possible, so this example should not be taken as limiting.

Embodiments of the Invention

Figure 2A:
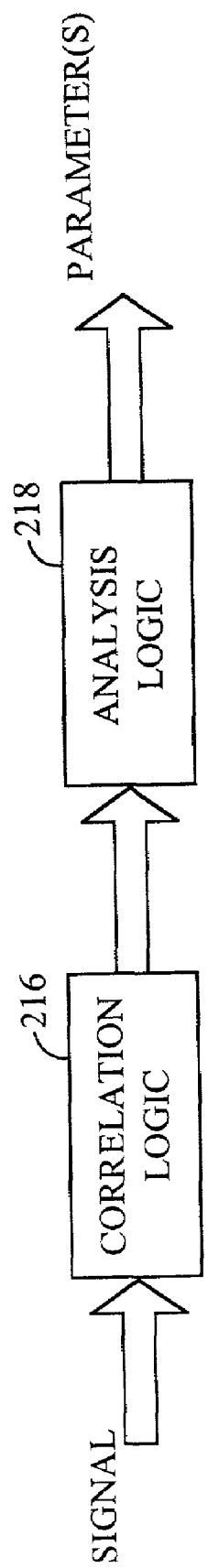
FIG. 2A is a simplified block diagram of one embodiment of a parameter estimator according to the invention.

Referring to FIG. 2A, a block diagram of one embodiment of a parameter estimator according to the invention is illustrated. As illustrated, in this embodiment, the parameter estimator comprises correlation logic 216 and analysis logic 218. For purposes of this disclosure, the term "logic" means hardware, software, or a combination of hardware and software. A signal is input to correlation logic 216. The signal may be a standalone signal or part of a composite signal comprising multiple signals. In one application, the signal is a pilot signal from a base station or sector in a wireless communications system and is part of a composite signal representing the transmissions from multiple base stations or sectors. The signal from each base station or sector is modulated with an identification code which, in one example, is a PN code. The identification code may be modulated onto the signal on a one-time or repeating basis.

Correlation logic 216 is configured to determine, using an integration time I, the correlation between the signal and shifted versions of an identification code. Obviously, the greatest degree of correlation will be exhibited if the identification code used by the correlation logic 216 matches that modulated onto the signal. The correlation logic 216 outputs a correlation function which represents the correlation between the signal and shifted versions of the identification code within a search window.

In one example, each sample of the signal S is a complex number having in-phase (I) and quadrature (Q) components, and the signal S is modulated with a PN code. In one implementation, a correlation value C, which depends on the PN code and the shift s in the PN code which are used, is coherent, i.e., retains phase information, and is a complex number which can be expressed as follows:

$$C(PN, s) = \sum_{i=k+0}^{k+N-1} PN(i-s) \cdot S(i) \quad (1)$$

where N is the (coherent) integration time in terms of chips, S(i) are samples of the received signal, and k is an arbitrary origin. In this implementation, the integration time I is the coherent integration time N.

In a second implementation, the correlation value C is a real number which is derived by non-coherently, i.e., not retaining phase information, combining M successive coherent integrations, each conducted over N chips. In this implementation, the correlation value C may be expressed as follows:

$$C(PN, s) = \sum_{j=1}^{M} \sum_{i=k+(j-1)N}^{k+jN-1} |PN(i-s) \cdot S(i)| \quad (2)$$

In this implementation, the integration time I is defined by the product of N and M.

The range of the shift s that is desired to be tested can be referred to as the search window W. The W values C(PN, s) which result together form a correlation function F(PN, s), which represents the degree of correlation between the signal and the shift s of the PN code (where the shift s is expressed in terms of chips) over a desired search window W. In the case where the PN code is repeatedly modulated onto the signal, the correlation function F(PN, s) will be periodic.

Figure 3A:
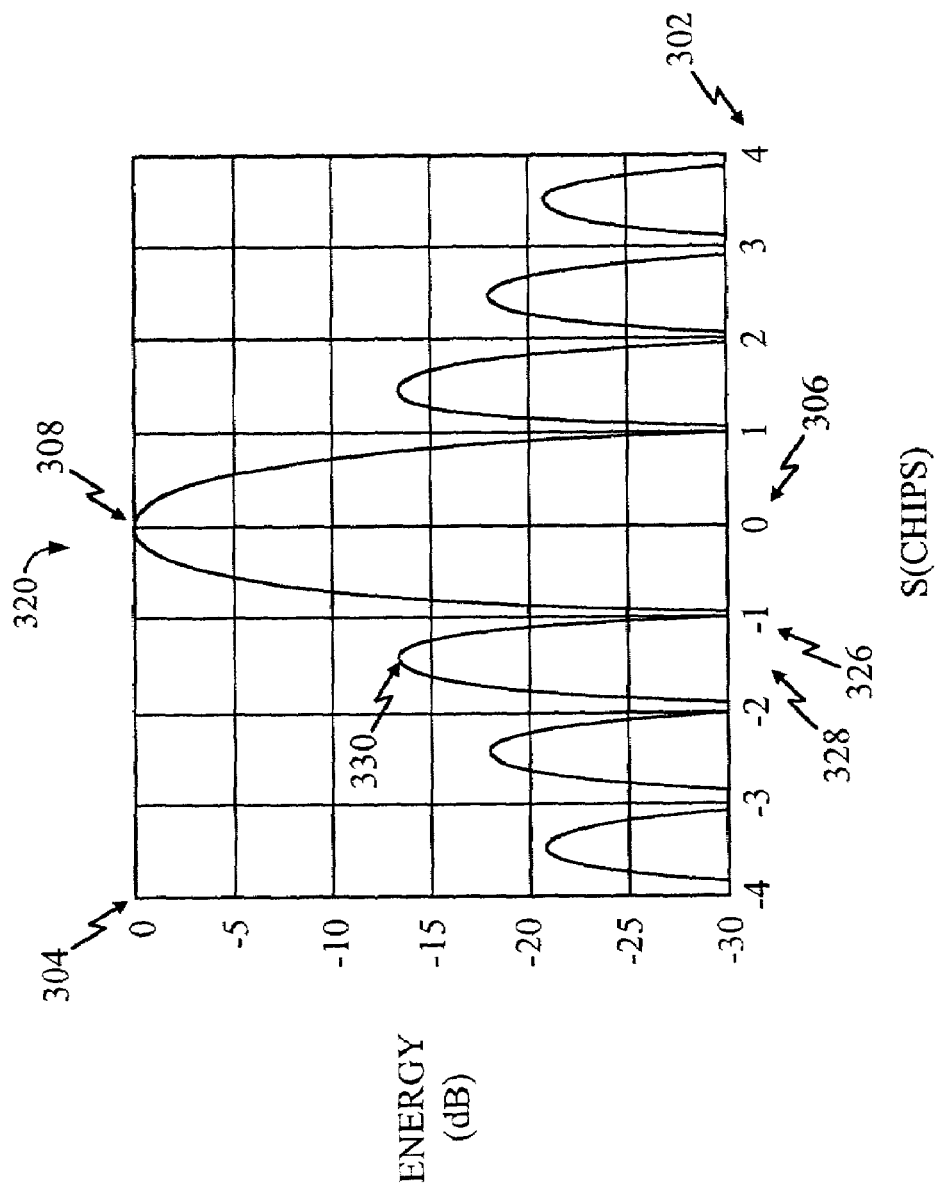
FIG. 3A is a time domain representation of one example of a correlation function for a CDMA pilot signal.

FIG. 3A illustrates an example of a correlation function F(PN, s) for a pilot signal in a CDMA wireless communication system. The window size (in terms of chips) in this example is 8, and the window is assumed to be centered at the origin 306. The horizontal axis 302 represents the shift of the PN code (expressed in terms of chips), and the vertical axis 304 represents the correlation function F(PN, s) (expressed in terms of Energy(dB)). As illustrated, the function in this example reaches a peak at the origin 306. This correlation function may constitute a component pulse in a real world correlation function derived from a composite signal representing a mixture of the pilot signals from multiple base stations or sectors, and multiple renderings of the same pilot signals arriving through different paths.

Figure 3B:
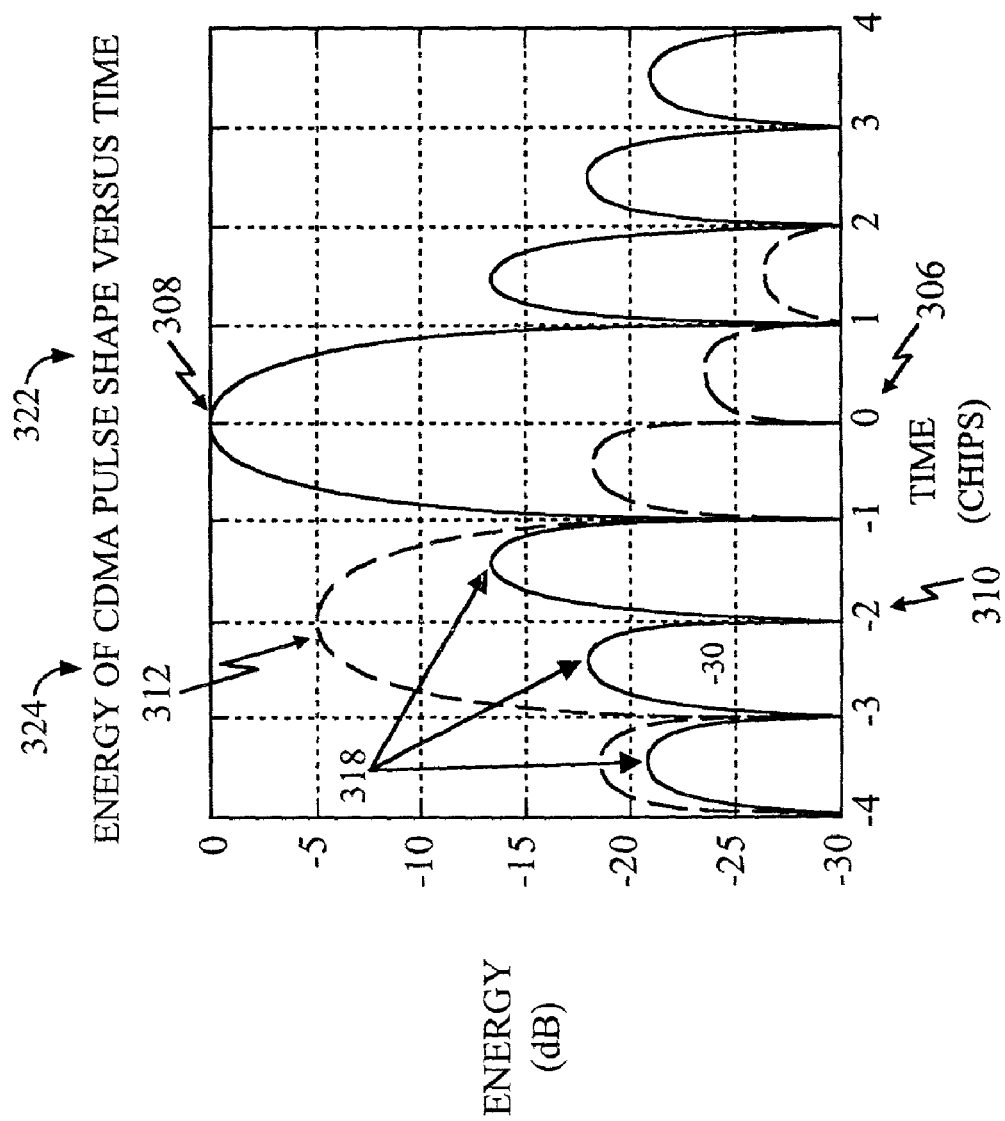
FIG. 3B illustrates direct line-of-sight and reflected renderings of the function of FIG. 3A.

Referring to FIG. 3B, an example of a correlation function F(PN, s) for a pilot signal in a CDMA communications system is illustrated where the effects of multi-path are depicted. The correlation function for a weaker earlier-in-time independent arrival, represented in the figure with a dashed line, is superimposed on the correlation function for a stronger independent arrival, which is represented in the figure with a solid line. The additive combination of these two correlation functions might represent the correlation function which is derived from a real world composite signal subject to the effects of multi-path. For purposes of this disclosure, an "independent" arrival includes one of multiple signals from different sources which arrive at a destination as well as one of multiple renderings of the same signal which arrive at a destination through different routes.

Figure 3C:
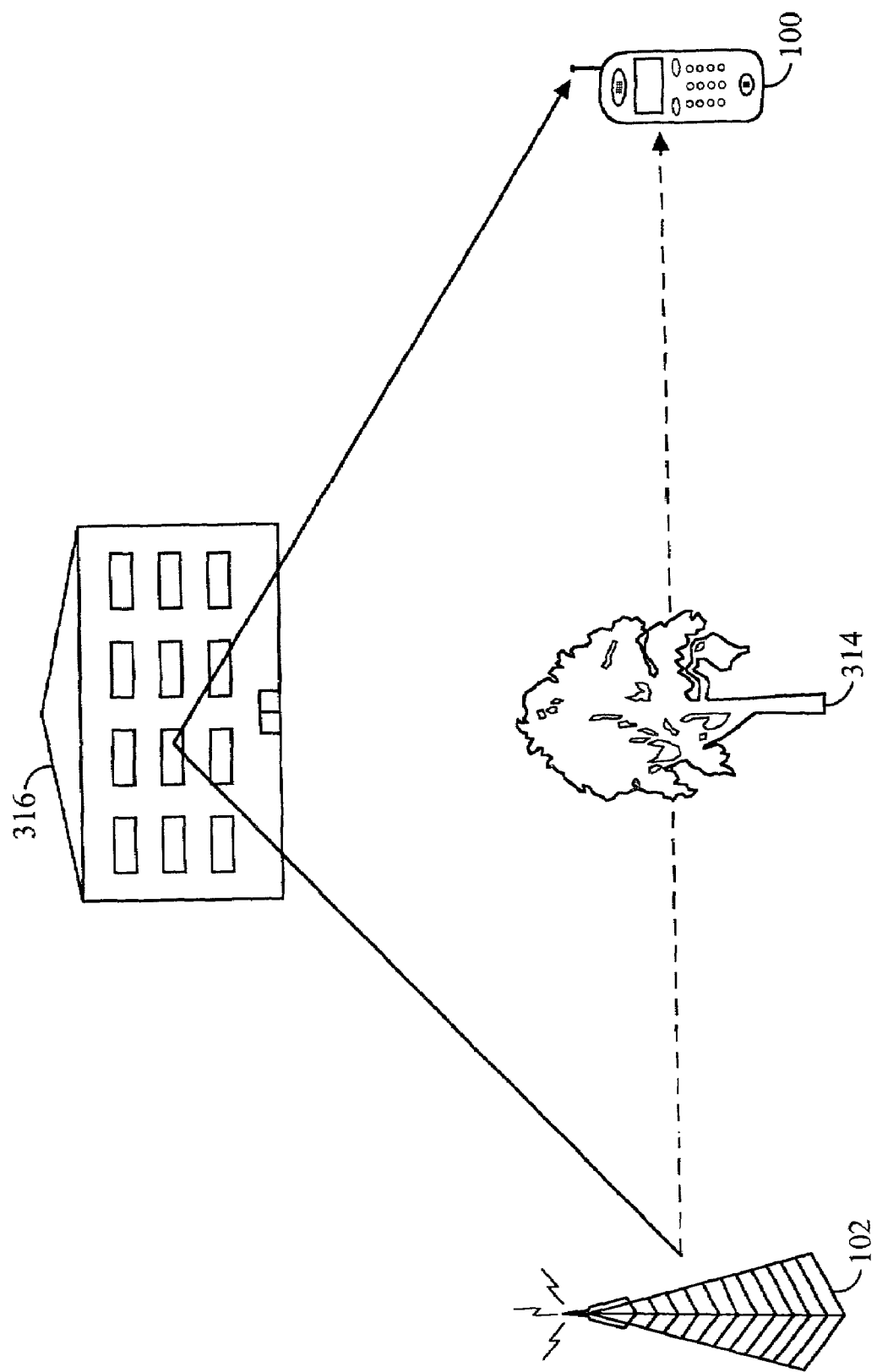
FIG. 3C illustrates direct and indirect arrivals of a pilot signal at a subscriber station due to multi-path.

FIG. 3C depicts an example of a situation which might give rise to the correlation function illustrated in FIG. 3B. As illustrated, the direct line-of-sight path between base station 102 and subscriber station 100 is blocked by an obstruction 314 (a tree in the example) which attenuates but still allows passage of the pilot signal. At the same time, due to multi-path, the same pilot signal may reflect off of another obstruction 316 (a building in the example) and be received by the subscriber station 100 with less attenuation than the direct line-of-sight arrival. This reflection from obstruction 316 might give rise to the correlation function represented in FIG. 3B with a solid line, while the direct line or sight rendering through obstruction 314 might give rise to the correlation function represented in FIG. 3C with a dashed line.

Turning back to FIG. 2A, once determined, the correlation function is input to analysis logic 218. Analysis logic 218 analyzes this correlation function and determines whether one or more first peak(s) of the correlation function are present, and, if so, whether they are distinguishable from the sidelobe(s) of the second peak. If the one or more first peak(s) are present and distinguishable from the sidelobe(s) of the second peak, the analysis logic 218 is then configured to determine the one or more parameter(s) from the one or more first peak(s). If, however, the one or more first peak(s) are not present, or, if present, are not distinguishable from the sidelobe(s) of the second peak, the analysis logic 218 is configured to determine the one or more parameter(s) from the second peak.

Thus, in the example of FIG. 3B, the analysis logic 218 may be configured to estimate the time of arrival (TOA) of the pilot, which requires detecting the position of the earliest non-sidelobe peak in the correlation function for the pilot. The analysis logic may first detect the strongest peak 308, which is the second peak using the previous terminology. It may then determine whether there are any earlier peaks present, such as peak 312, and, if present, whether peak 312 represents an independent arrival or whether it is one of the sidelobes 318 of the main peak 308. In the previous terminology, peak 312 is the first peak. If peak 312 is present and represents an independent arrival rather than a sidelobe of the main peak 308, the analysis logic 318 determines the time of arrival of the pilot responsive to the time/position of peak 312. If no peaks earlier than peak 308 are detected, which represent independent arrivals in contrast to sidelobe(s) of the main peak 308, analysis logic 318 estimates the time of arrival of the pilot responsive to the time/position of the main peak 308.

Figure 2B:
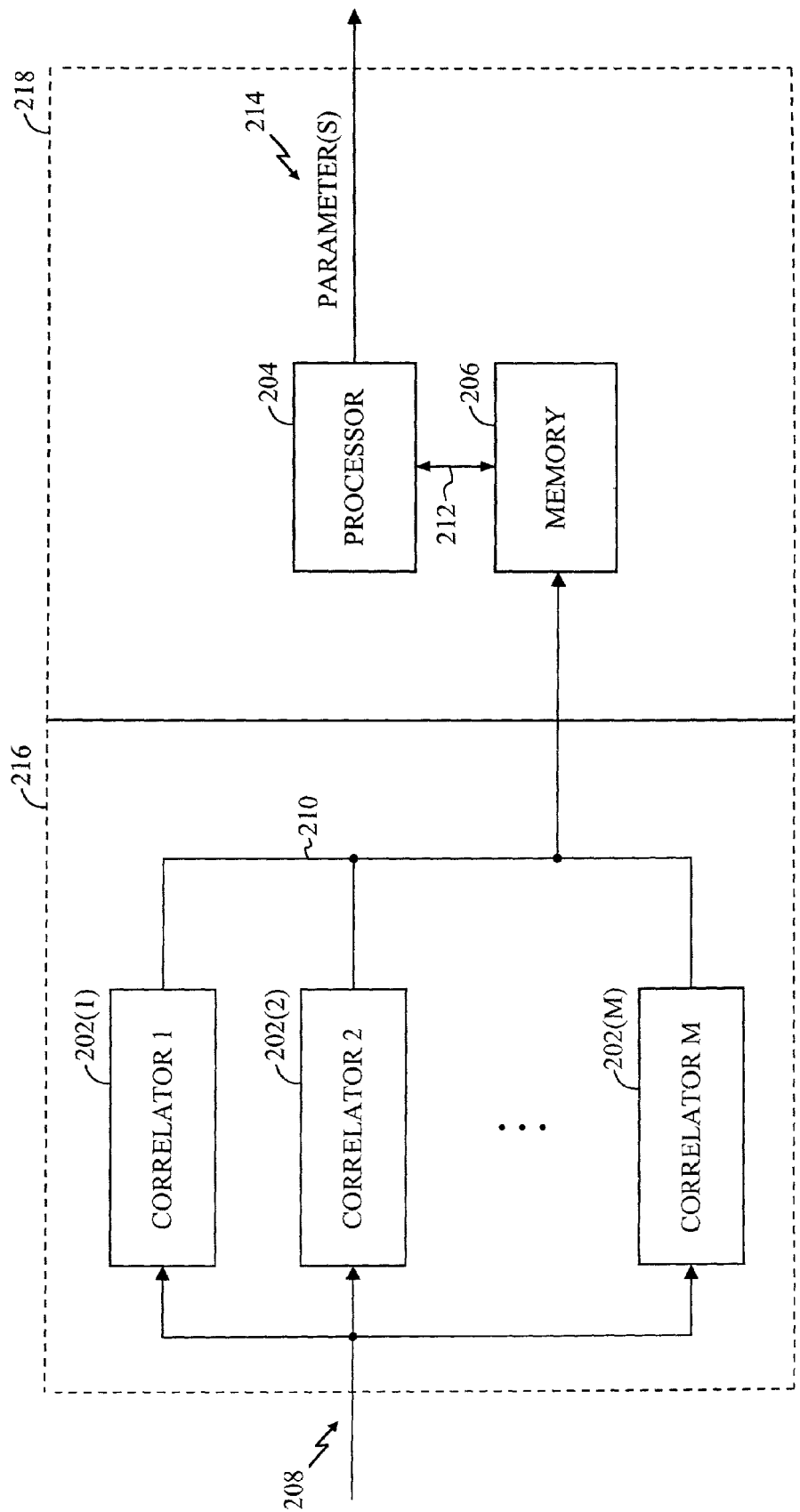
FIG. 2B is a simplified block diagram of one implementation of a parameter estimator according to the invention.

Referring to FIG. 2B, a block diagram of a second embodiment of a parameter estimator according to the invention is illustrated. A signal 208 is input in parallel to each of R correlators 202(1), 202(2), ..., 202(R), where R is an integer of one or more, over one or more signal line(s) 208. Again, the signal 208 may be a standalone signal or a part of a composite signal. In one implementation example, R is 16. In a second implementation example, R is 256. Each of the R correlators determines, in parallel, using an integration time, a correlation value representing the degree of correlation between a shifted version of a selected PN code and the signal.

In one implementation, each of the R correlators operates using a shifted version of the same PN code, with each correlator assigned a different shift value. The collection of correlation values determined by the R correlators forms the correlation function F(PN, s). If the window size W is then than R, the number of correlators, the correlation function F(PN, s) can be determined through a single pass through the parameter estimator. If, on the other hand, the number of correlators R is less than W, the window size, one or more additional iterations through the parameter estimator may be needed to determine the correlation function F(PN, s).

Once determined, the correlation function F(PN, s) is output on one or more signal line(s) 210 and stored in memory 206. In like manner, the correlation functions for other PN codes can be determined by the correlators 202(1), 202(2), ..., 202(R), and stored in memory 206.

The processor 204 is configured to retrieve a correlation function F(PN, s) from memory 206 over one or more signal line(s) 212, and determine whether one or more first peak(s) are present, and if so, whether they are distinguishable from the sidelobe(s) of a second peak. If such peak(s) are present and distinguishable from the sidelobe(s) of the second peak, it then estimates the one or more parameter(s) from the one or more first peak(s). If such peak(s) are not present, or, if present, are not distinguishable from the sidelobe(s) of the second peak, processor 204 then estimates the one or more parameter(s) from the second peak.

In one implementation, the processor 204 attempts to estimate time of arrival (TOA), root mean squared error (RMSE) of the TOA estimate, and energy per chip divided by total received power ($E_c/I_0$) for the signal. If the attempt is unsuccessful, the processor 204 may direct the R correlators 202(1), 202(2), ..., 202(R) to re-determine the correlation function using a different integration time. This process may iterate one or more times until the one or more parameter(s) may be estimated from the correlation function or it is determined that the parameter(s) cannot be estimated. If the one or more parameter(s) can be and are estimated, the processor 204 may be configured to output them over one or more signal line(s) 214.

The processor 204 may be any device capable of executing a series of instructions embodying a process, including but not limited to a computer, microprocessor, an ASIC, finite state machine, DSP, or some other mechanism.

In addition, the memory 206 may be any device readable by a processor and capable of storing a series of instructions embodying a process, including but not limited to RAM, ROM, EPROM, EEPROM, PROM, disk (hard or floppy), CD-ROM, DVD, flash memory, etc.

In one embodiment, the analysis logic 218 and/or processor 204 are configured to distinguish the one or more first peak(s) from sidelobe(s) of the second peak based on a priori knowledge regarding the correlation function. In particular, the shape, amplitude, phase, or any combination thereof, of a component pulse of a correlation function representing an independent arrival (such as illustrated in FIG. 3A) may be known, and, responsive to this information, the analysis logic 218 and/or processor 204 estimates the one or more parameter(s).

For example, referring to FIG. 3A, if a first peak is detected at a time offset of −1 chip, identified in the figure with numeral 326, with an energy of −15 dB, the peak can be safely said to represent an independent arrival since the pulse for the second main peak has minimal energy at this point. On the other hand, if a first peak is detected at a time offset of −1.5 chips, identified in the figure with numeral 328, with an energy of −15 dB, the peak would be indistinguishable from the sidelobe 330 of the strongest peak 308. Instead, that peak would have to have to exceed about −13 dB for it to be distinguishable from the sidelobe 330.

In a second embodiment, the analysis logic 218 and/or processor 204 are configured to determine whether the one or more first peak(s) are distinguishable from the sidelobe(s) of the second peak using a threshold. If the energy of the one or more first peak(s) equals or exceeds the threshold, they are considered to be distinguishable from the sidelobe(s) of the selected peak.

In general, the threshold T may be a variable which is dependent on one or more of $E_1$, the energy of a first peak, $E_2$, the energy of the second peak, $h(t_1-t_2)$, the expected shape, amplitude, or phase, or any combination thereof, of a component pulse of the correlation function corresponding to an independent arrival (which is centered at the second peak) at the time $t_1$ of the first peak, and I, the integration time. (In one implementation, the integration time I may comprise two components, N, the coherent integration time, and M, the number of coherent integrations which are non-coherently combined.). Dependent on one or more of these variables, the threshold may be set to limit the false alarm probability, i.e., the probability that a sidelobe of the second peak will be erroneously reported as the first peak, to a predetermined level, e.g., 0.1%, or below. If the energy $E_1$ of the first peak equals or exceeds the threshold, the first peak is considered to be distinguishable from the sidelobe(s) of the second peak. In one example, this condition can be expressed as follows:

$$E_1 \geq T(E_1, E_2, h(t_1-t_2), I-) \quad (3)$$

In one implementation, a noise floor, $\gamma$, is determined which is dependent on the integration time I. If the energy of the first peak, $E_1$, is within a predetermined range $\Delta$ of the energy of the second peak $E_2$, and equals or exceeds the noise floor, the first peak is considered to be distinguishable from the sidelobe(s) of the second peak. In this implementation, the threshold T may be expressed as:

$$T = \max(E_2 - \Delta, \gamma(I)) \quad (4)$$

Figure 4A:
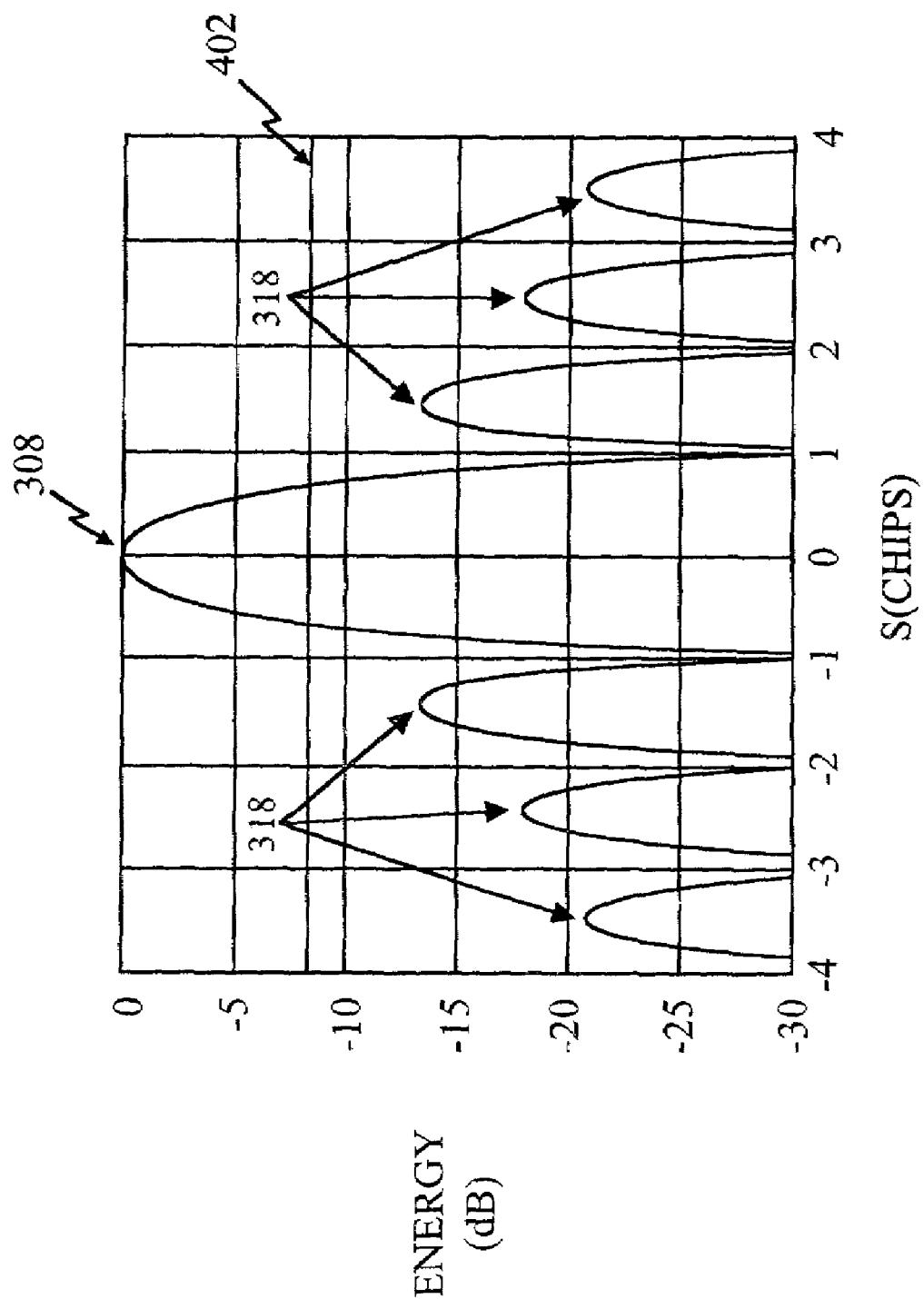
FIG. 4A illustrates an implementation of the invention employing a single threshold to distinguish a first peak from sidelobe(s) of a second peak.

Referring to FIG. 4A, an example of a threshold set according to this implementation is identified with numeral 402. If any first candidate peaks are detected which exceed this threshold in the example, they are deemed to represent independent arrivals and be distinguishable from the sidelobe(s) 318 of the second main peak 308.

In a second implementation, a noise floor, $\gamma$, is determined which is dependent on the integration time I, and the difference (or absolute value of the difference) between the energy of the second peak $E_2$ and the energy of the first peak $E_1$. The noise floor, $\gamma$, in this implementation may be expressed either as $\gamma(E_2-E_1,I)$ or as $\gamma(|E_2-E_1|,I)$. The threshold T in this implementation is simply the noise floor $\gamma$.

In one example of this implementation, a first noise floor/threshold is employed if the energy of the first peak $E_1$ is within a first range $\Delta_1$, e.g., 6 dB, of the energy of the second peak $E_2$, and a second stricter noise floor/threshold is employed if the energy of the first peak $E_1$ is within a second range $\Delta_2$, e.g., 9 dB, of the energy of the second peak $E_2$. In this example, the first peak is considered to be distinguishable from the sidelobe(s) of the second peak if (1) the energy of the first peak $E_1$ equals or exceeds the first noise floor and is within $\Delta_1$ of $E_2$ or (2) the energy of the first peak $E_1$ equals or exceeds the second noise floor and is within $\Delta_2$ of $E_2$. This example may be readily extended to situations involving more than two noise floors.

Figure 4B:
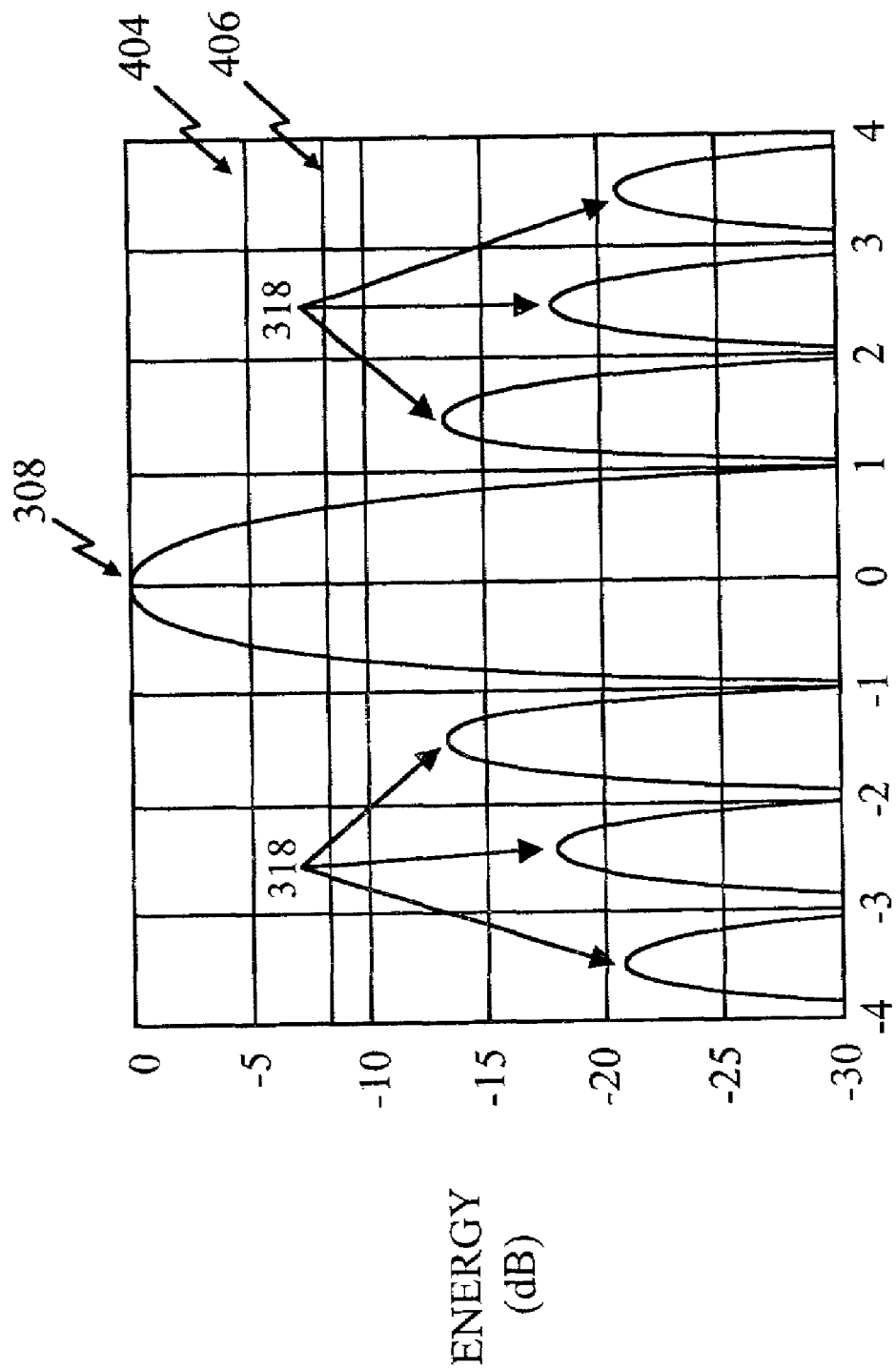
FIG. 4B illustrates an implementation of the invention employing multiple noise floors/thresholds to distinguish a first peak from sidelobe(s) of the second peak.

Referring to FIG. 4B, an example of this implementation is illustrated where two thresholds, identified with numerals 404 and 406, are defined. The threshold 404 in this example is applicable in the case where the energy of the first candidate peak is within 9 dB of that of the second main peak 308, and the threshold 406 is applicable in the case where the energy of the first candidate peak is within 6 dB of that of the second main peak 308.

In a third implementation, the threshold is dependent on the time difference between the first and second peaks. For example, the threshold may be reduced as the amplitude of the sidelobes of the second peak decreases.

Referring to FIG. 4C, an example of this implementation is illustrated. The threshold which is applied to distinguish a first candidate peak from the sidelobe(s) 318 of the second main peak 308 is identified in the figure with numerals 408a, 408b, 408c, 408d, and 408e. As illustrated, the threshold varies over time dependent on the amplitude of the sidelobe(s) of the main peak 308.

Figure 5:
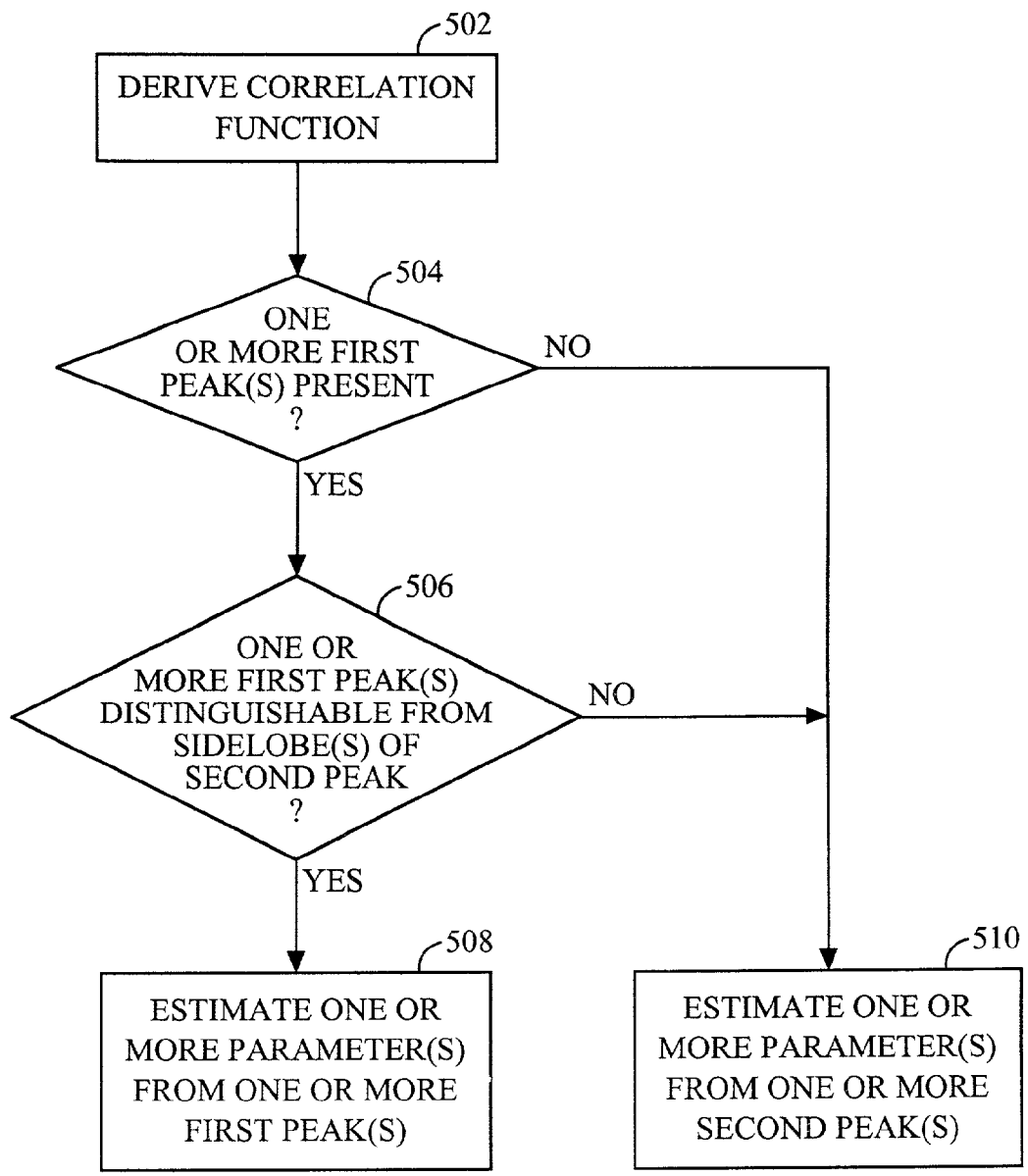
FIG. 5 is a flowchart of one embodiment of a method, according to the invention, of estimating one or more parameter(s) of a signal.

Referring to FIG. 5, a flowchart of one embodiment of a method according to the invention of estimating one or more parameter(s) of a signal is illustrated. The method begins with step 502, which comprises deriving a correlation function from a signal. It then proceeds to step 504, which comprises determining whether one or more first peak(s) are present. If so, the method proceeds to step 506. If not, the method branches to step 510.

In step 506, the method determines whether the one or more first peak(s) are distinguishable from one or more sidelobe(s) of a second peak. If so, the method proceeds to step 508, which comprises estimating the one or more parameter(s) responsive to the one or more first peak(s). If not, the method branches to step 510.

In step 510, the method estimates the one or more parameter(s) responsive to the second peak.

In one embodiment, the method employs a priori knowledge regarding the shape, amplitude, phase, or any combination thereof, of the correlation function to determine if the one or more first peak(s) are distinguishable from the sidelobe(s) of the second peak.

In a second embodiment, the method employs a threshold to determine whether the one or more first peaks(s) are distinguishable from the sidelobe(s) of the second peak. The threshold may be a variable dependent on one or more of $E_1$, $E_2$, the shape, phase or amplitude, or any combination thereof, of $h(t_1-t_2)$, and I, as described above.

In one implementation, the method employs a noise floor $\gamma$ which is dependent on the integration time I. If the energy of a first peak $E_1$ exceeds the noise floor $\gamma(I)$, and is within a predefined range $\Delta$ of the energy of the second peak $E_2$, the first peak is considered to be distinguishable from the sidelobe(s) of the second peak. In this implementation, the threshold T may be expressed as set forth in equation (4) above.

In a second implementation, the method employs a noise floor $\gamma$ is a function of the integration time I and also $E_2-E_1$ (or the absolute value of $E_2-E_1$). In this implementation, the threshold T which is employed is simply the noise floor. In one example of this implementation, the method employs a first noise floor/threshold if the energy of the first peak $E_1$ is within a first range $\Delta_1$, e.g., 6 dB, of the energy of the second peak $E_2$, and employs a second, stricter noise floor/threshold if the energy of the first peak $E_1$ is within a second more relaxed range $\Delta_2$, e.g., 9 dB, of the energy of the second peak $E_2$. This example may be readily extended to situations involving more than two noise floors.

In a third implementation, the threshold is dependent on the difference between the time of the first and second peaks. For example, the threshold may decrease as the amplitude of the sidelobes of the second peak decreases.

When the technique represented by any of these embodiments, implementations or examples is applied to a composite signal representing multiple independent arrivals (such as a pilot signal subject to multi-path), compared to the GPS detection method, performance is greatly improved since parameters of these signals such as the time of arrival can now be accurately estimated.

Several examples and implementations of a method of estimating one or more parameter(s) of a signal in the context of an overall advanced forward link trilateration (AFLT) process for a CDMA wireless communications system will now be described.

Figure 6:
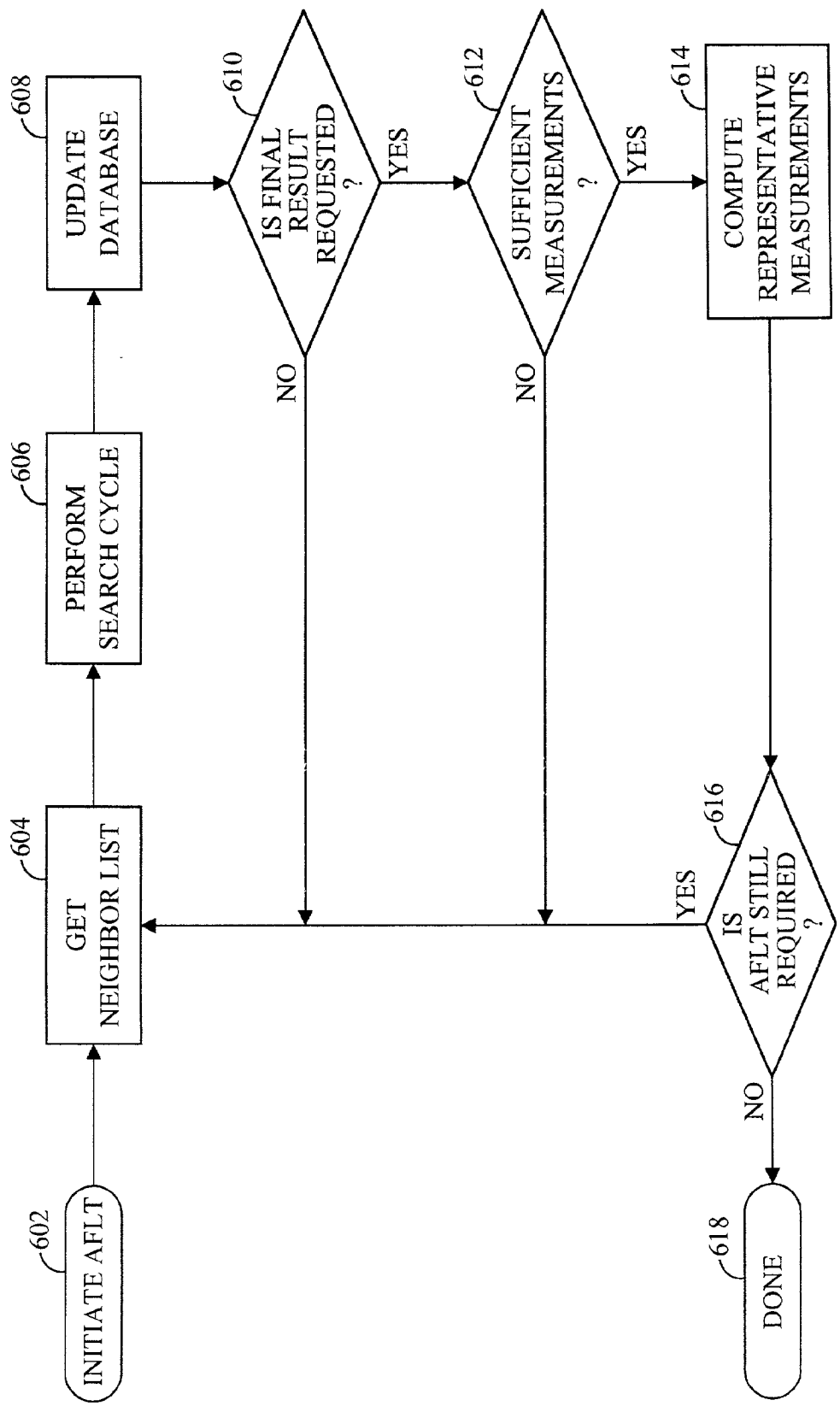
FIG. 6 is a high level flowchart of one implementation of an overall Advanced Forward Link Trilateration (AFLT) process.

Referring to FIG. 6, a flowchart of the overall AFLT process is illustrated. In step 602, the AFLT process is initiated. Control then passes to step 604, where the subscriber station obtains from the active base station or sector, i.e., the base station or sector with which it is currently registered, a list of the neighboring base stations or sectors. Step 606 is then performed. In step 606, the subscriber station conducts a search cycle, i.e., it performs a search of the pilots for the listed base stations or sectors (as well as the pilot of the active base station or sector). The output of the search cycle is a list of the pilots searched, and for each such pilot, either an indication that the pilot is undetectable, or estimates of one or more parameter(s) relating to the pilot, including but not limited to time of arrival (TOA), a measure of the level of confidence in the TOA estimate, such as a root mean squared error (RMSE), energy per chip divided by total received power ($E_c/I_0$), or any combination of the foregoing. Step 608 follows step 606. In step 608, the results of the search cycle are stored in a database.

Step 610 is then performed. In step 610, a determination is made whether a PDE in communication with the subscriber station has requested final results. If not, the method continues to iterate by looping back to step 604. To conserve memory space, the results of the search cycles obtained through these additional iterations may override the earlier recorded results.

If final results have been requested, the method proceeds to step 612, where a determination is made whether sufficient measurements have been obtained to enable the position of the subscriber station to be estimated. In one implementation, this is deemed to occur when TOA measurements having a high level of confidence have been obtained from at least four base stations or sectors. In another implementation, this is deemed to occur when a fixed number of search cycles have been completed. If insufficient measurements have been obtained, the method continues to iterate by looping back to step 604. If sufficient measurements have been obtained, the method proceeds to step 614. In step 614, a single measurement representative of the set of measurements in the database is obtained for each PN and is provided to the PDE. In one implementation, this step is performed by choosing the earliest measurement in the set of measurements, and averaging all of the measurements within a fixed amount of time of the earliest measurement.

Control then passes to step 616, in which the PDE indicates to the subscriber station whether or not AFLT is still required. If not, control passes to step 618, and the process terminates. If so, control passes to step 604 for another iteration of the method.

Figure 7:
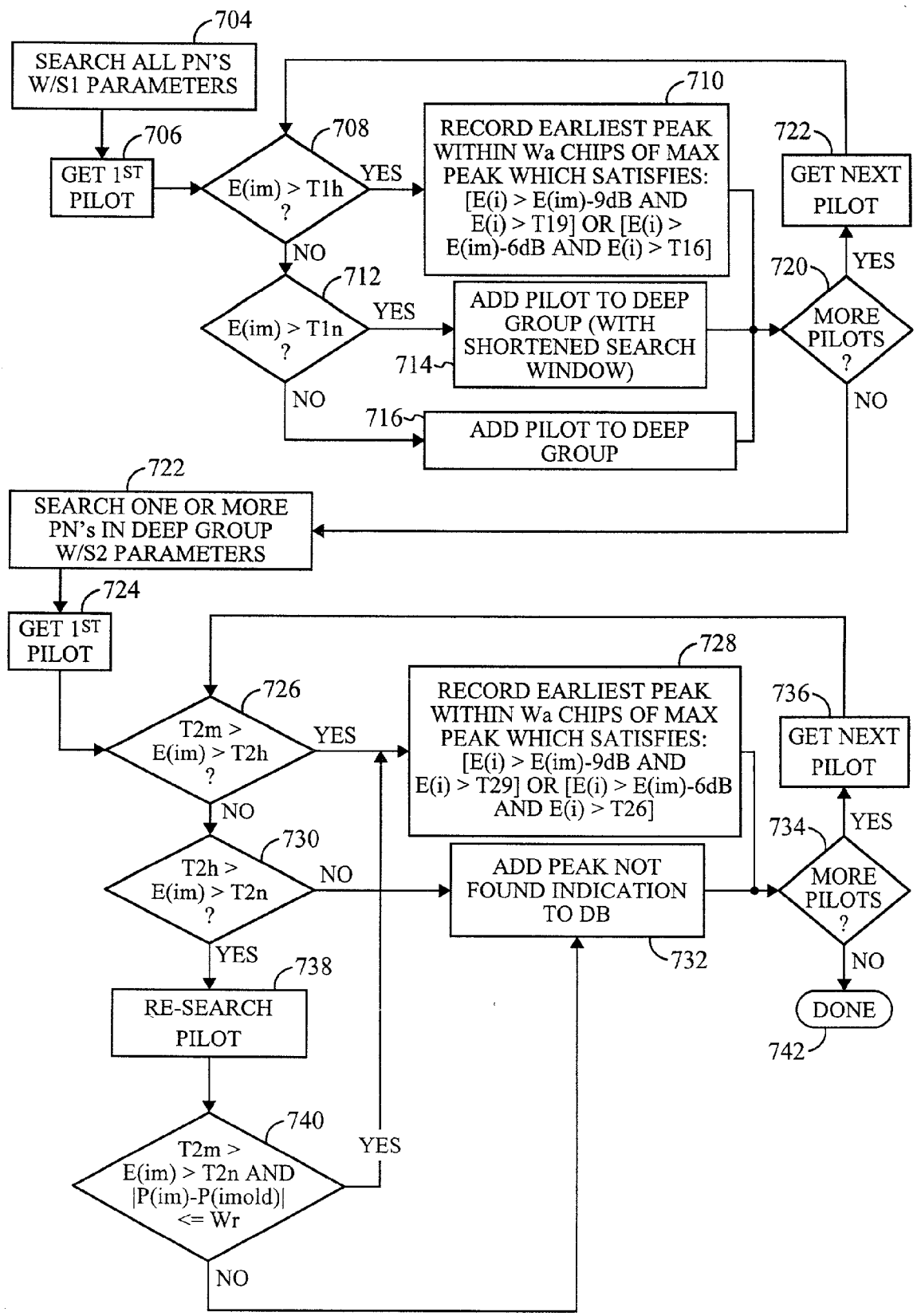
FIG. 7 is a flowchart of one example of a method, according to the invention, of estimating a time of arrival (TOA) parameter of a CDMA pilot signal.

Referring to FIG. 7, a flowchart of one example of a method for performing the search cycle step 606 in FIG. 6 is illustrated. As illustrated, the method begins with step 704, where each of the listed (and active) pilots is "searched" using S1 search parameters, i.e., a correlation function F(PN, s) is obtained for each of the listed neighbor and active PN codes using an integration time specified as part of the S1 search parameters. In one implementation, the S1 search parameters specify a coherent integration time of 1,024 chips and also specify that 4 coherent integrations are to be non-coherently combined to form a correlation value. (However, other examples are possible, so this example should not be taken as limiting.)

Step 706 is then performed. This step comprises obtaining the correlation function F(PN, s) for the first pilot. Control then passes to step 708, which comprises testing the energy of the strongest peak of the correlation function for the pilot, E(im), in relation to a threshold T1$h$, which is set to indicate when the initial integration time is sufficient to accurately estimate the desired parameters. (FIG. 8, to be discussed farther on, illustrates an example setting of this threshold.).

If the energy of the strongest peak, E(im), exceeds the threshold T1$h$, step 710 is performed. In step 710, the position of the earliest peak within Wa, e.g., 4, chips of the strongest peak that is not a sidelobe of the strongest peak is recorded. The peak is deemed to be other than a sidelobe of the strongest peak if (1) the energy of the peak, E(i), is within 9 dB of the energy of the main peak, E(im), and the energy E(i) exceeds a threshold T19, or (2) the energy of the peak, E(i), is within 6 dB of the energy of the main peak, E(im), and the energy E(i) exceeds a threshold T16. (FIG. 8, described father on, illustrates example settings of these thresholds.). If an earlier peak within Wa chips of the main peak is not present, or, if present, does not satisfy either of the foregoing two conditions, this step records the position of strongest peak. The corresponding time of arrival, RMSE, and $E_c/I_0$ measurements for the pilot are also derived and recorded.

If the energy of the strongest peak, E(im) does not exceed the threshold T1$h$, control then passes to step 712. In step 712, the energy of the strongest peak E(im) is tested in relation to a threshold T1$n$, which is set at the lower limit of the dynamic range of the parameter estimator using the S1 search parameters.

If the energy of the strongest peak, E(im), exceeds the threshold T1$n$, control passes to step 714, where the pilot is added to a "deep" group, i.e., a group to be subjected to the greater integration time specified by S2 search parameters, with an indication that the pilot is to be subjected to a shortened search window (since a fix on the location of the strongest peak of the pilot has already been obtained).

If the energy of the strongest peak, E(im), does not exceed the threshold T1$n$, control then passes to step 716. In step 716, the pilot is added to the deep group, but the original window size is retained since the strongest peak for the pilot has heretofore been undetectable.

From steps 710, 714, and 716, control then passes to step 720. In step 720, it is determined whether there are additional pilots that remain to be tested. If so, control passes to step 722, where one of these remaining pilots is selected. Control then passes to step 708 for another iteration. If no more pilots remain to be tested, control then passes to step 722.

In step 722, one or more of the pilots added to the deep group are "searched" using S2 search parameters, i.e., a correlation function F(PN, s) is obtained for one or more of the pilots in the deep group using the integration time specified by the S2 search parameters. In one implementation, the S2 search parameters specify a coherent integration time of 2,048 chips, and that 16 coherent integrations are to be non-coherently combined to form a correlation value. (However, other examples are possible, so this example should not be taken as limiting.)

Note that step 722 need not be performed for all of the pilots in the deep group. In one implementation, step 722 is performed only in relation to those pilots which, in step 714, were added to the deep group and marked to be searched again with a shortened search window, and a subset of those pilots which, in step 716, were added to the deep group with the original window size retained.

From step 722, control passes to step 724. In step 724, one of the pilots searched in the previous step is selected. Control then passes to step 726. In step 726, the energy (Eim) of the strongest peak for the selected pilot is compared to two thresholds T2$m$ and T2$h$, where T2$m$ represents the upper limit of the dynamic range of the parameter estimator using the S2 search parameters and T2$h$ is a threshold set to indicate when the existing results can be used to accurately estimate the desired parameters. (FIG. 8, to be discussed farther on, illustrates an example setting of these thresholds.).

If the energy E(im) is less than T2$m$ and greater than T2$h$, control passes to step 728. In step 728, the position of the earliest peak within Wa chips, e.g., 4 chips, of the strongest peak that is not a sidelobe of the strongest peak is recorded. The peak is deemed to be other than a sidelobe of the strongest peak if (1) the energy of the peak, E(i), is within 9 dB of the energy of the main peak, E(im), and the energy E(i) exceeds a threshold T29, or (2) the energy of the peak, E(i), is within 6 dB of the energy of the main peak, E(im), and the energy E(i) exceeds a threshold T26. (FIG. 8, described father on, illustrates example settings of these thresholds.). If an earlier peak within Wa chips of the main peak is not present, or, if present, does not satisfy either of the foregoing two conditions, this step records the position of strongest peak. The time of arrival, RMSE, and $E_c/I_0$ measurements for the pilot are also derived and recorded.

If the energy E(im) is not between T2m and T2h, control passes to step 730, where the energy E(im) is tested in relation to two thresholds T2h and T2n. T2h was described previously, and T2n is set at the lower limit of the dynamic range of the parameter estimator using the S2 search parameters. (Again, FIG. 8, to be discussed farther on, illustrates an example setting of these thresholds.).

If the energy E(im) is not between these two thresholds, control passes to step 732, where a peak not found indication is recorded.

If the energy E(im) is between these two parameters, control passes to step 738, where the pilot is re-searched, i.e., the correlation function for the pilot re-determined using the integration time specified by the S2 search parameters.

Step 740 is then performed. In step 740, the energy E(im) of the strongest peak resulting from the re-search is tested in relation to the thresholds T2m and T2n (which represent the upper and lower limits of the dynamic range of the parameter estimator resulting from the S2 search parameters). (FIG. 8, to be discussed farther on, illustrates an example setting of these thresholds.).

If the energy E(im) is between these two thresholds and the change in position of the strongest peak from the old search to the new search, i.e., the value |P(im)−P(imold)|, is less than a predetermined window Wr (which in one non-limiting example is 4 chips), control passes back to step 728, where the position of the earliest peak within a predetermined interval of the strongest peak that is not a sidelobe of the main strongest peak (determined using the criteria set forth in step 728) is recorded. (And where the position of the strongest peak is recorded if an earlier peak is not detected, or, if detected, does not satisfy the prescribed conditions set forth in step 728.).

If, in step 740, the specified conditions are not met, control passes to step 732, where a peak not found indication is recorded.

From steps 728 and 732, control passes to step 734. In step 734, a determination is made whether any of the pilots that were searched in step 722 remain to be evaluated. If so, control passes to step 736, where one of these pilots is selected. Control then loops back to step 726, for another iteration. If no pilots remain, control passes to step 742, where the search cycle terminates.

Figure 8:
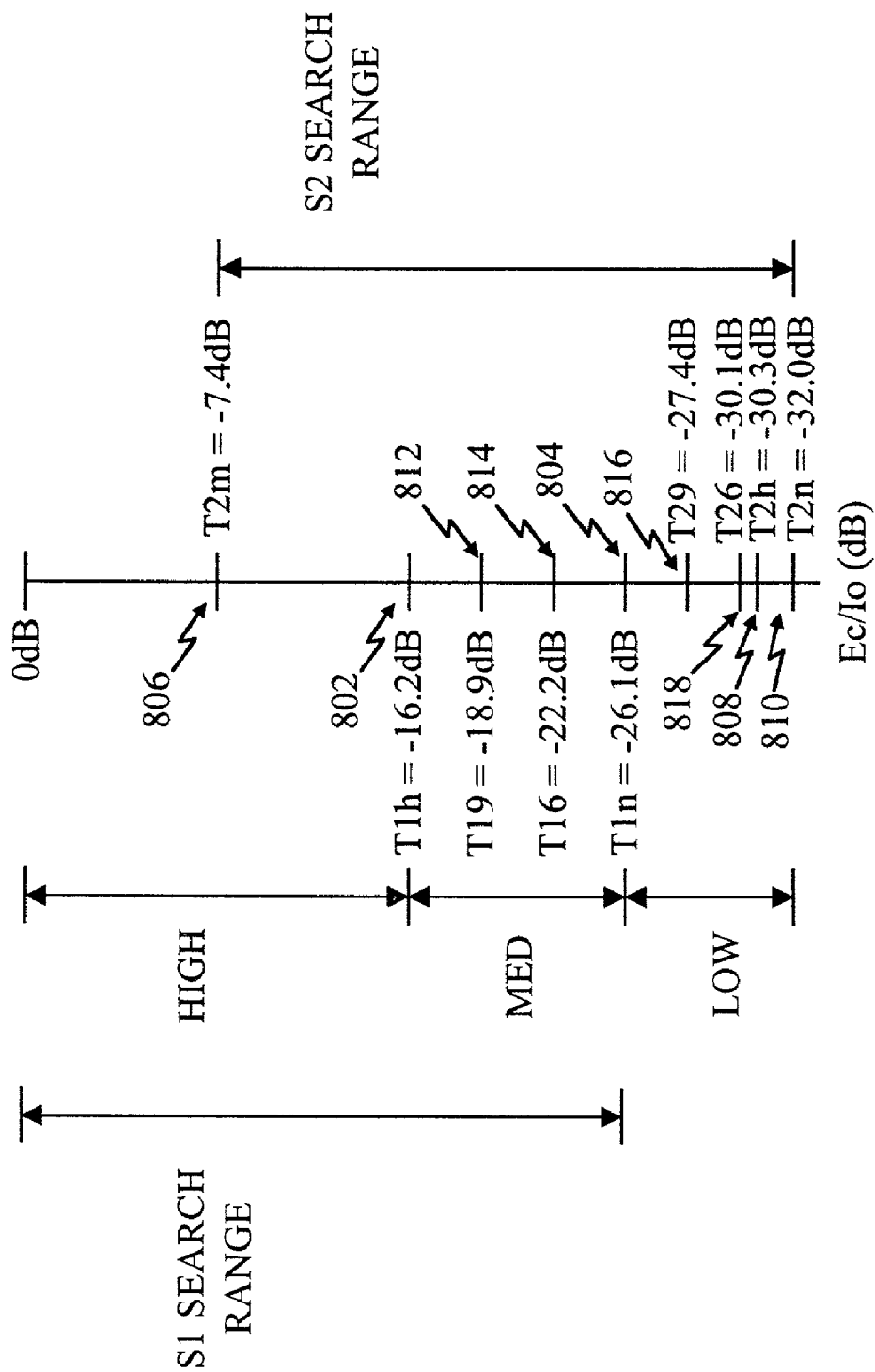
FIG. 8 is a diagram illustrating thresholds used in the example of FIG. 7.

Referring to FIG. 8, an example setting of the thresholds T1h, T19, T16, T1n, T2m, T29, T26, T2h, and T2n, is illustrated. The threshold T1h is set to indicate when an accurate estimate of the desired parameters can be made using the S1 search parameters; the threshold T19 is the noise floor for distinguishing a candidate peak from sidelobes of the main peak when the energy of the candidate peak is within 9 dB of that of the main peak and the S1 search parameters are in effect; the threshold T16 is the noise floor for distinguishing a candidate peak from sidelobes of the main peak when the energy of the candidate peak is within 6 dB of that of the main peak and the S1 search parameters are in effect; the threshold T1n is set at the lower limit of the dynamic range of the estimator using the S1 search parameters; the thresholds T2m and T2n are, respectively, the upper and lower limits of the dynamic range of the estimator using the S2 search parameters; the threshold T29 is the noise floor for distinguishing a candidate peak from sidelobes of the main peak when the energy of the candidate peak is within 9 dB of the main peak and the S2 search parameters are in effect; the threshold T26 is the noise floor for distinguishing a candidate peak from sidelobes of the main peak when the energy of the candidate peak is within 6 dB of the main peak and the S2 search parameters are in effect; and the threshold T2h is set to indicate when an accurate estimate of the desired parameters can be made using the S2 search parameters.

In particular, the dynamic range of the parameter estimator for the S1 search parameters ranges from an upper limit of 0 dB to a lower limit of −26.1 dB, while the dynamic range of the parameter estimator for the S2 search parameters ranges from an upper limit of −7.4 dB to a lower limit of −32.0 dB. The threshold T1h, identified with numeral 802, is set at −16.2 dB; the threshold T19, identified with numeral 812, is set at −18.9 dB; the threshold T16, identified with numeral 814, is set at −22.2 dB; and the threshold T1n, identified with numeral 804, is set at −26.1 dB, the lower limit of the dynamic range of the parameter estimator using the S1 search parameters. In addition, the threshold T2m, identified with numeral 806, is set at −7.4 dB, the upper limit of the dynamic range of the parameter estimator using the S2 search parameters. The threshold T29, identified with numeral 816, is set at −27.4 dB, and the threshold T26, identified with numeral 818, is set at −30.1 dB. The threshold T2h, identified with numeral 808, is set at −30.3 dB, and the threshold T2n, identified with numeral 810, is set at −32.0 dB, the lower limit of the dynamic range of the parameter estimator using the S2 search parameters. Many other examples are possible, so this example should not be taken as limiting.

Figure 9:
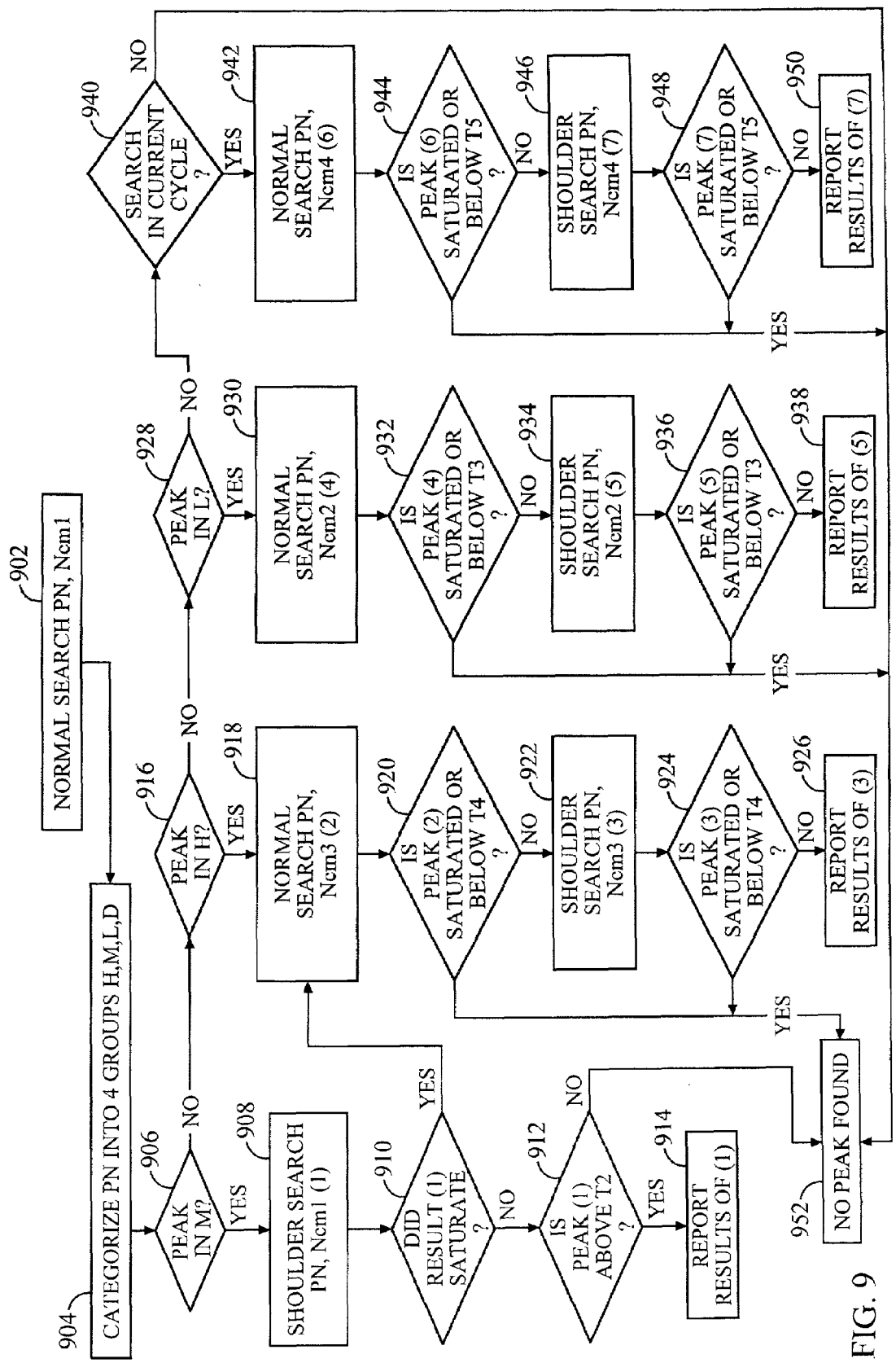
FIG. 9 is a flowchart of a second example of a method, according to the invention, of estimating a TOA parameter of a CDMA pilot signal.

Referring to FIG. 9, a flowchart of a second example of a method of performing the search cycle step 606 in the method of FIG. 6 is illustrated. In step 902, a "normal" search is conducted of one of the PNs in a group comprising the neighbor list plus the active PN, i.e., the pilot with which the subscriber station is currently registered and in communication with. A "normal" search is a search for the all of the peaks of the pilot in order to determine the coarse time of arrival of the earliest peak that is not a sidelobe of the strongest peak (which can be the strongest peak if an earlier peak is not present, or, if present, is not distinguishable from the sidelobe(s) of the strongest peak), and is to be contrasted with a "shoulder" search, i.e., a search for the precise time of arrival of the specific earliest peak determined from the "normal" search. In one implementation example, the normal search locates peaks with a resolution of ±½ chips, while the shoulder search locates peaks with a resolution of ±1/16 chips. The normal search in step 902 is performed using the integration time specified by the Ncm1 search parameters. In one implementation, the Ncm1 search parameters specify a coherent integration time of 768 chips and that 8 successive coherent integrations are to be non-coherently combined, but it should be appreciated that other examples are possible. In the "normal" search conducted in step 902, a candidate peak is considered to be distinguishable from a sidelobe of the main peak if it is above a threshold Ts1 and within 6 dB of the main peak. (FIG. 10, described farther on, provides an example setting of this threshold.).

Control then passes to step 904, where the results of the search are used to classify the pilot into one of four groups, a high (H) group, a medium (M) group, a low (L) group, and a deep (D) group. In one implementation, the pilot is classified within the H group if the peak detected for the pilot in step 902 saturated the estimator; the pilot is classified within the M group if the peak detected in step 902 is above a threshold T1 and did not saturate the estimator; the pilot is classified within the L group if the peak detected in step 902 is above a threshold T2 but below T1; and all other pilots are classified within the D group. (FIG. 10, described farther on, illustrates example settings of these thresholds.).

After step 904, control passes to step 906, where the peak identified in step 902 for the pilot is tested to determine if it is classified within the M group. If so, control passes to step 908, where a shoulder search is conducted using the integration time specified by the Ncm1 search parameters.

From step 908, control then passes to step 910. In step 910, the results of the search conducted in step 908 are evaluated to determine if they caused the estimator to saturate. If so, control passes to step 918 (to be discussed later). If not, control passes to step 912.

In step 912, the peak resulting from step 908 is tested to determine if it is above a threshold T2. (FIG. 10, described farther on, illustrates an example setting of this threshold.).

If the peak resulting from step 908 is above the threshold T2, control passes to step 914, where the position of the peak detected in step 908 is recorded along with corresponding measurements such as TOA, RMSE, and $E_c/I_0$. If the peak resulting from step 908 is not above the threshold T2, control passes to step 952, where an indication that no peak was found is recorded.

Turning back to step 906, if the peak identified in step 902 for the pilot is not classified within the M group, control passes to step 916, where it is determined whether the peak is classified within the H group. If so, control passes to step 918, where a normal search of the pilot is conducted using the integration time specified by the Ncm3 search parameters. In one implementation, the Ncm3 search parameters specify a coherent integration time of 512 chips, and that 2 successive coherent integrations are to be non-coherently combined. However, it should be appreciated that other examples are possible, so this example should not be taken as limiting. In the normal search conducted in step 918, a candidate peak is considered to be distinguishable from a sidelobe of the main peak if it is above a threshold Ts3, and is within 6 dB of the main peak. (FIG. 10, described farther on, illustrates an example setting of this threshold.).

From step 918, control passes to step 920. In step 920, the peak resulting from step 918 is tested to determine if it resulted in saturation of the estimator or is below a threshold T4. (FIG. 10, described farther on, illustrates an example setting of this threshold.).

If the peak resulting from step 918 resulted in saturation of the estimator or is below the threshold T4, control passes to step 952, where a peak not found indication is recorded. Otherwise, control passes to step 922, where a shoulder search of the pilot is conducted using the integration time specified by the Ncm3 search parameters.

Control then passes to step 924, where the peak resulting from step 922 is tested to determine if it resulted in saturation of the estimator or is below the T4 threshold. If either of these conditions are met, control passes to step 952, where a peak not found indication is recorded. If both are unmet, control passes to step 926, where the position of the peak found in step 922 is recorded along with corresponding TOA, RMSE, and $E_c/I_0$ measurements.

Turning back to step 916, if the peak resulting from step 902 for the pilot is not classified in the H group, control passes to step 928, where it is determined whether it is classified in the L group. If so, control passes to step 930, where a normal search of the pilot is performed using an integration time as specified in the Ncm2 search parameters. In one implementation, the Ncm2 search parameters specify a coherent integration time of 1,024 chips and that 16 successive coherent integrations are to be non-coherently combined. However, it should be appreciated that other examples are possible, so this example should not be taken as limiting. In this normal search, a peak is considered to be distinguishable from a sidelobe of the main peak if it is above a threshold Ts2, and is within 6 dB of the main peak. (FIG. 10, described farther on, illustrates an example setting of this threshold.).

From step 930, control passes to step 932. In step 932, the peak resulting from step 930 is analyzed to determine if it resulted in saturation of the estimator, or is below a threshold T3. (FIG. 10, described farther on, illustrates an example setting of this threshold.).

If the peak resulting from step 930 results in saturation of the estimator or is below the T3 threshold, control passes to step 952, where a peak not found indication is recorded. If neither of these conditions are satisfied, control passes to step 934, where a shoulder search of the pilot is conducted using the integration time specified by the Ncm2 search parameters.

Step 936 is then performed. In step 936, a determination is made whether the peak resulting from step 934 resulted in saturation of the estimator or is below the T3 threshold. If so, control passes to step 952, where a peak not found indication is recorded. If not, control passes to step 938, where the position of the peak found in step 936 is recorded along with corresponding TOA, RMSE, and $E_c/I_0$ measurements.

Turning back to step 928, if the peak resulting from the search conducted in step 902 is not classified in the L group, control passes to step 940. In step 940, a determination is made whether there is still time in the current search cycle. If not, control passes to step 952, where a peak not found indication is recorded.

This step recognizes that, because of the long dwell times required for the pilots that are in the D group, it may not be possible to perform a search of all the pilots in this group within the current search cycle. Therefore, this step checks the time remaining in the current search cycle to determine if it can accommodate a search of the pilot. If insufficient time is available, a peak not found indication is recorded for the pilot, while, if sufficient time remains, the pilot is searched. In one alternative to this step, in order to allow limits to be placed on the length of the search cycle, only a predetermined number, e.g., 4, of the pilots in the D group are searched during a search cycle.

Assuming there is still time remaining in the current search cycle or the pilot is one of the members of the D group which is selected to be searched during the current search cycle, control passes to step 942. There, a normal search of the pilot is conducted using the integration time specified by the Ncm4 search parameters. In one implementation, the Ncm4 search parameters specify a coherent integration time of 2,048 chips and that 16 successive coherent integrations are to be non-coherently combined. However, it should be appreciated that other examples are possible, so this example should not be taken as limiting. In this normal search, a peak is considered to be distinguishable from a sidelobe of the main peak if it is above a threshold Ts4, and within 6 dB of the main peak. (FIG. 10, described farther on, illustrates an example setting of this threshold.).

From step 942, control passes to step 944, where it is determined whether the peak resulting from step 942 results in saturation of the estimator or is below a threshold T5. (FIG. 10, described farther on, illustrates an example setting of this threshold.). If either of these conditions are met, control passes to step 952, where a peak not found indication is recorded. If both are unmet, control passes to step 946, where a shoulder search of the pilot is performed using the integration time specified by the Ncm4 search parameters.

From step 946, step 948 is performed. In step 948, it is determined whether the peak resulting from step 948 results in saturation of the estimator or is below the T5 threshold. If either of these conditions are met, control passes to step 952, where a peak not found indication is recorded. If both are unmet, step 950 is performed. In step 950, the position of the peak resulting from step 946 is recorded, as well as corresponding TOA, RMSE, and $E_c/I_0$ measurements.

The process of FIG. 9 may continue to iterate for each of the pilots in the group comprising the neighbor list and the active pilot.

Figure 10:
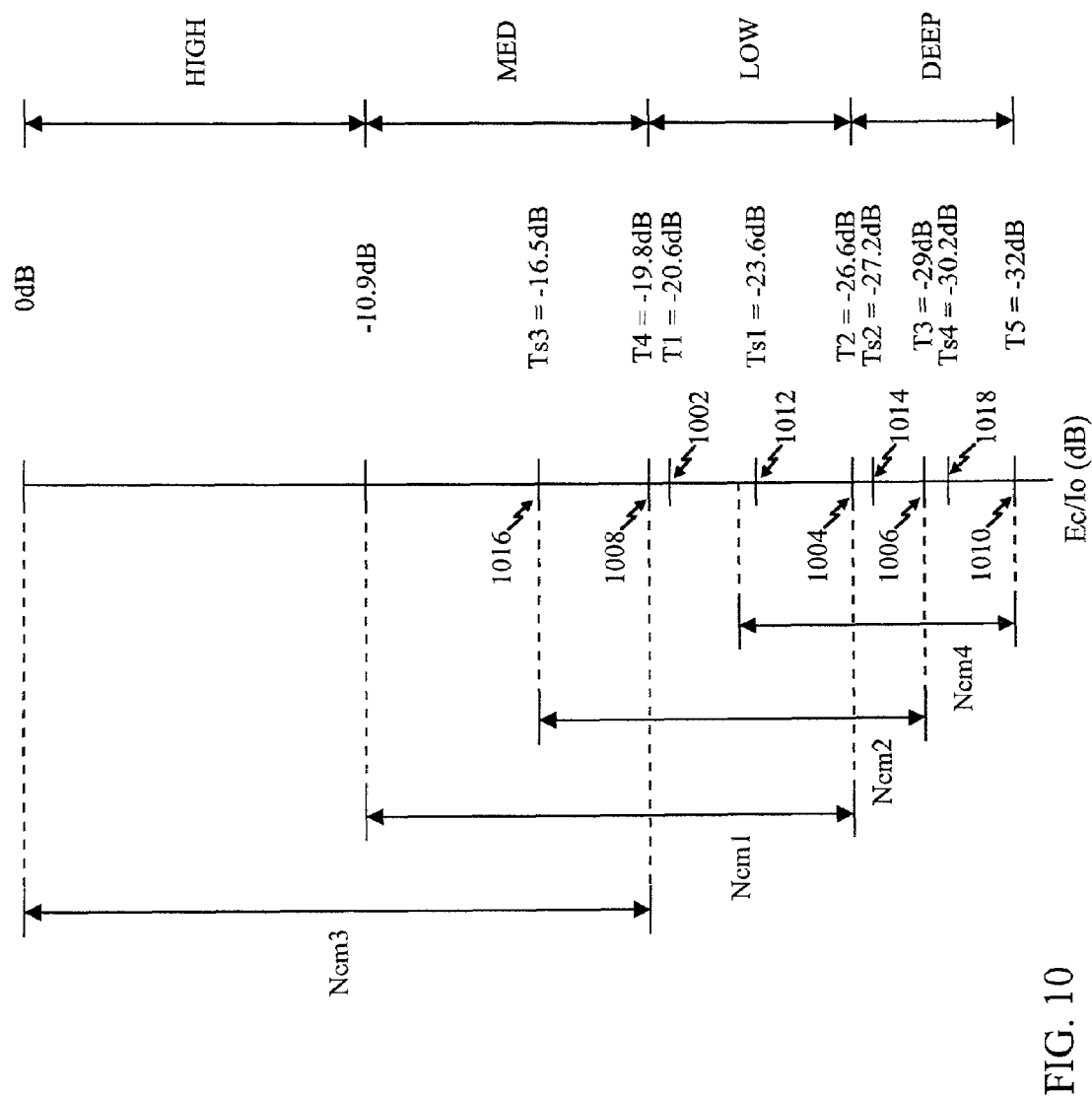
FIG. 10 is a diagram illustrating thresholds used in the example of FIG. 9.

Referring to FIG. 10, an example setting of the thresholds T1, T2, T3, T4, T5, Ts1, Ts2, Ts3, and Ts4 is illustrated. The threshold T1, identified with numeral 1002, marks the boundary between the L and M groups; the threshold T2, identified with numeral 1004, marks the boundary between the L and D groups, and is set to indicate when the parameter estimate(s) are accurate using the Ncm1 search parameters; the threshold T3, identified with numeral 1006, is set to indicate when the parameter estimate(s) are accurate using the Ncm2 search parameters; the threshold T4, identified with numeral 1008, is set to indicate when parameter estimate(s) are accurate using the Ncm3 search parameters; and the threshold T5, identified with numeral 1010, is set to indicate when the parameter estimate(s) are accurate using the Ncm4 search parameters. In addition, the threshold Ts1, identified with numeral 1012, is the noise floor for detecting whether a candidate peak within 6 dB of the main peak and identified using the Ncm1 search parameters, is distinguishable from a sidelobe of the main peak; the threshold Ts2, identified with numeral 1014, is the noise floor for detecting whether a candidate peak within 6 dB of the main peak and identified using the Ncm2 search parameters, is distinguishable from a sidelobe of the main peak; the threshold Ts3, identified with numeral 1016, is the noise floor for detecting whether a candidate peak within 6 dB of the main peak and identified using the Ncm3 search parameters, is distinguishable from a sidelobe of the main peak; and the threshold Ts4, identified with numeral 1018, is the noise floor for detecting whether a candidate peak within 6 dB of the main peak and identified using the Ncm4 search parameters, is distinguishable from a sidelobe of the main peak.

In particular, in the example illustrated, the threshold T1 is set to −20.6 dB; the threshold T2 is set to −26.6 dB; the threshold T3 is set to −29 dB; the threshold T4 is set to −19.8 dB; and the threshold T5 is set to −32 dB. In addition, the threshold Ts1 in this example is set to −23.6 dB; the threshold Ts2 is set to −27.2 dB; the threshold Ts3 is set to −16.5 dB; and the threshold Ts4 is set to −30.2 dB. However, it should be appreciated that other examples are possible, so that this example should not be construed as limiting.

Comparing the methods of FIGS. 7 and 9, it can be seen that the method of FIG. 7 involves limiting false alarm probabilities through the use of appropriately set thresholds, while that of FIG. 9 uses thresholds as well as a double detection criterion, whereby a pilot is subjected to both normal and shoulder searches, to avoid false alarms.

Any of the foregoing methods may be tangibly embodied in a variety of forms, including but not limited to, a form where a series of instructions embodying the method is stored on a processor readable medium or a server in a computer network such as the Internet, where the method is embodied as synthesized logic, or where the method is embodied as a computer program product, i.e., a code segment or module.

Note that, in the foregoing embodiments, implementations, and examples, it is assumed that the energies are expressed in dB, but it should be appreciated that the invention also covers the case where the energies are expressed in linear terms, and that these embodiments, implementations, and examples may be readily extended to the linear case by re-expressing differences as ratios or multiplications.

For example, the expression $T=\max(E_2-\Delta,\gamma(I))$ may be reformulated to cover the linear case as follows: $T=\max(E_2 \cdot f, \gamma(I))$, where f is a suitable fraction or percentage. Similarly, the expression $\gamma(E_2-E_1,I)$ for the noise floor $\gamma$ may be reformulated for the linear case as follows: $\gamma(E_1/E_2,I)$. Finally, the example in which a first noise floor/threshold is utilized if the energy of the first peak $E_1$ is within a first range $\Delta_1$, e.g., 6 dB, of the energy of the second peak $E_2$, and a second, stricter noise floor/threshold is utilized if the energy of the first peak $E_1$ is within a second more relaxed range $\Delta_2$, e.g., 9 dB, of the energy of the second peak $E_2$, may be re-expressed in terms of using the first noise floor/threshold if the ratio of the energy of the first peak $E_1$ to the energy of the second peak $E_2$ equals or exceeds a first fraction or percentage $f_1$, and using the second, stricter noise floor/threshold if the ratio of the energy of the first peak $E_1$ to the energy of the second peak $E_2$ equals or exceeds a second smaller fraction or percentage $f_2$.

While various embodiments of the invention have been described, it will be apparent to those of ordinary skill in the art that many more embodiments and implementations are possible that are within the scope of this invention.

What is claimed is:

1. A parameter estimator comprising:
   correlation logic for determining a correlation function representing a correlation between a signal and one or more shifted versions of an identification code; and
   analysis logic for analyzing the correlation function to determine whether one or more first peak(s) are distinguishable from one or more sidelobe(s) of a second peak responsive to a threshold dependent on a noise floor, estimating one or more parameter(s) relating to the signal responsive to the one or more first peak(s) when the one or more first peak(s) are present and are distinguishable from the sidelobe(s) of the second peak, and estimating the one or more parameter(s) responsive to the second peak when the one or more first peak(s) are not present, or, when present, are not distinguishable from the sidelobe(s) of the second peak.

2. The parameter estimator of claim 1 wherein the second peak is the strongest peak.

3. The parameter estimator of claim 2 wherein the one or more first peaks(s), if any, are earlier in time than the strongest peak.

4. The parameter estimator of claim 1 wherein the identification code is a PN code.

5. The parameter estimator of claim 1 configured to distinguish a first peak from the sidelobe(s) of the second peak using a priori knowledge regarding the correlation function.

6. The parameter estimator of claim 5 wherein the a priori knowledge relates to the shape, amplitude, phase, or any combination thereof, of a component pulse of the correlation function representing an independent arrival.

7. The parameter estimator of claim 1 wherein the threshold is a variable dependent on one or more of the energy of the first peak, the energy of the second peak, the shape, amplitude, phase, or any combination thereof, of a component pulse of the correlation function representing an independent arrival, the time difference between the first and second peaks, and an integration time.

8. The parameter estimator of claim 1 wherein the noise floor is dependent on integration time.

9. The parameter estimator of claim 1 wherein the noise floor is set to limit a false alarm probability.

10. The parameter estimator of claim 1 wherein the threshold is also dependent on the difference between the energy of the second peak and the energy of the first peak.

11. The parameter estimator of claim 1 wherein the threshold is also dependent on the ratio of the energy of the first peak to the energy of the second peak.

12. The parameter estimator of claim 1 wherein the threshold is derived from the maximum of the noise floor and the difference between the energy of the second peak and a predefined range.

13. The parameter estimator of claim 1 wherein the threshold is derived from the maximum of the noise floor and a predetermined fraction of the energy of the second peak.

14. The parameter estimator of claim 8 wherein the noise floor is also dependent on the difference between the energy of the second peak and the energy of the first peak.

15. The parameter estimator of claim 8 wherein the noise floor is also dependent on the ratio of the energy of the first peak to the energy of the second peak.

16. A parameter estimator comprising:
 correlation logic for determining a correlation function representing a correlation between a signal and one or more shifted versions of an identification code; and
 analysis logic for analyzing the correlation function to determine whether one or more first peak(s) are distinguishable from one or more sidelobe(s) of a second peak responsive to multiple thresholds, including a first threshold and a second threshold, wherein the first threshold is applicable when the energy of the first peak is within a first predefined range of the energy of the second peak, and wherein the second threshold is applicable when the energy of the first peak is within a second predefined range of the energy of the second peak, estimating one or more parameter(s) relating to the signal responsive to the one or more first peak(s) when the one or more first peak(s) are present and are distinguishable from the sidelobe(s) of the second peak, and estimating the one or more parameter(s) responsive to the second peak when the one or more first peak(s) are not present, or, when present, are not distinguishable from the sidelobe(s) of the second peak.

17. The parameter estimator of claim 16 wherein the second threshold is stricter than the first threshold, and the second predefined range is more relaxed in relation to the first predefined range.

18. The parameter estimator of claim 16 wherein the first threshold is applicable if the ratio of the energy of the first peak to the energy of the second peak equals or exceeds a first fraction, and the second threshold is applicable if the ratio of the energy of the first peak to the energy of the second peak equals or exceeds a second fraction.

19. The parameter estimator of claim 18 wherein the second threshold is stricter than the first fraction threshold, and the second fraction is smaller than the first.

20. A parameter estimator comprising:
 correlation means for determining a correlation function representing a correlation between a signal and one or more shifted versions of an identification code; and
 analysis means for analyzing the correlation function to determine whether one or more first peak(s) are distinguishable from one or more sidelobe(s) of a second peak responsive to a threshold dependent on a noise floor, estimating one or more parameter(s) relating to the signal responsive to the one or more first peak(s) when the one or more first peak(s) are present and are distinguishable from the sidelobe(s) of the second peak, and estimating the one or more parameter(s) responsive to the second peak when the one or more first peak(s) are not present, or, when present, are not distinguishable from the sidelobe(s) of the second peak.

21. A method of estimating one or more parameter(s) of a signal comprising:
 determining a correlation function representing a correlation between a signal and one or more shifted versions of an identification code;
 analyzing the correlation function to determine whether one or more first peak(s) are distinguishable from one or more sidelobe(s) of a second peak responsive to a threshold dependent on a noise floor;
 estimating one or more parameter(s) relating to the signal responsive to the one or more first peak(s) when the one or more first peak(s) are present and are distinguishable from the sidelobe(s) of the second peak; and
 estimating the one or more parameter(s) responsive to the second peak when the one or more first peak(s) are not present, or, when present, are not distinguishable from the sidelobe(s) of the second peak.

22. The method of claim 21 wherein the signal is a pilot signal.

23. The method of claim 21 wherein the identification code is a PN code.

24. The method of claim 21 wherein the second peak is the strongest peak.

25. The method of claim 24 wherein the one or more first peak(s) are earlier in time than the strongest peak.

26. The method of claim 21 wherein the one or more parameter(s) relating to the signal include a time of arrival (TOA) parameter.

27. The method of claim 26 wherein the one or more parameter(s) for the signal include a root mean squared error (RMSE) for the TOA parameter.

28. The method of claim 21 wherein the one or more parameter(s) for the signal include an $E_c/I_0$ parameter.

29. The method of claim 21 further comprising:
 determining if the one or more first peak(s) are distinguishable from the second peak using a priori knowledge regarding the correlation function.

30. The method of claim 29 wherein the a priori information is knowledge regarding the shape, amplitude, phase, or any combination thereof, a component pulse of the correlation function representing an independent arrival.

31. The method of claim 21 wherein the threshold is a variable dependent on one or more of the energy of the second peak, the energy of the first peak, the shape, amplitude, phase, or any combination thereof, of the component pulse of the correlation fraction corresponding to the second peak at the time of the first peak, the time difference between the first and second peaks, and the integration time used to derive the correlation function.

32. The method of claim 21 wherein the noise floor is dependent on the integration time.

33. The method of claim 21 wherein the noise floor is set to limit a false alarm probability.

34. The method of claim 21 wherein the threshold is also dependent on the difference between the energy of the second peak and the energy of the first peak.

35. The method of claim 21 wherein the threshold is also dependent on the ratio of the energy of the first peak to the energy of the second peak.

36. The method of claim 21 wherein the threshold is derived from a maximum of noise floor and a predetermined fraction of the energy of the second peak.

37. The method of claim 32 wherein the noise floor is also dependent on the difference between the energy of the second peak and the energy of the first peak.

38. The method of claim 32 wherein the noise floor is also dependent on the ratio of the energy of the first peak to the energy of the second peak.

39. A method of estimating one or more parameter(s) of a signal comprising:
- determining a correlation function representing a correlation between a signal and one or more shifted versions of an identification code;
- analyzing the correlation function to determine whether one or more first peak(s) are distinguishable from one or more sidelobe(s) of a second peak responsive to multiple thresholds, including a first threshold and a second threshold, wherein the first threshold is applicable when the energy of the first peak is within a first predefined range of the energy of the second peak, and wherein the second threshold is applicable when the energy of the first peak is within a second predefined range of the energy of the second peak;
- estimating one or more parameter(s) relating to the signal responsive to the one or more first peak(s) when the one or more first peak(s) are present and are distinguishable from the sidelobe(s) of the second peak; and
- estimating the one or more parameter(s) responsive to the second peak when the one or more first peak(s) are not present, or, when present, are not distinguishable from the sidelobe(s) of the second peak.

40. The method of claim 39 wherein the second threshold is stricter than the first threshold, and the second predefined range is relaxed in relation to the first predefined range.

41. The method of claim 39 wherein a first threshold is applicable if the ratio of the energy of the first peak to the energy of the second peak equals or exceeds a first fraction, the second threshold is applicable if the ratio of the first peak the energy of the second peak equals or exceeds a second fraction.

42. The method of claim 41 wherein the second threshold is stricter than the first threshold, and the second fraction is smaller than the first.

43. A method of estimating one or more parameter(s) of a signal comprising:
- determining a correlation function representing a correlation between a signal and one or more shifted versions of an identification code;
- analyzing the correlation function to determine whether one or more first peak(s) are distinguishable from one or more sidelobe(s) of a second peak responsive to a threshold that is dependent on a difference between a time of a first peak and a time of the second peak;
- estimating one or more parameter(s) relating to the signal responsive to the one or more first peak(s) when the one or more first peak(s) are present and are distinguishable from the sidelobe(s) of the second peak; and
- estimating the one or more parameter(s) responsive to the second peak when the one or more first peak(s) are not present, or, when present, are not distinguishable from the sidelobe(s) of the second peak.

44. A method of estimating one or more parameter(s) of a signal comprising:
- a step for determining a correlation function representing a correlation between a signal and one or more shifted versions of an identification code;
- a step for analyzing the correlation function to determine whether one or more first peak(s) are distinguishable from one or more sidelobe(s) of a second peak responsive to a threshold dependent on a noise floor;
- a step for estimating one or more parameter(s) relating to the signal responsive to the one or more first peak(s) when the one or more first peak(s) are present and are distinguishable from the sidelobe(s) of the second peak; and
- a step for estimating the one or more parameter(s) responsive to the second peak) when the one or more first peak(s) are not present, or, when present, are not distinguishable from the sidelobe(K) of the second peak.

45. A subscriber station comprising a parameter estimator of any of claims 1, 16, or 20.

46. The subscriber station of claim 45, which is a mobile station.

47. A computer readable medium encoded with computer instructions executable by a computer to perform the methods of any of claims 21, 39, 43, or 44.

48. A computer network comprising a computer readable medium encoded with computer instructions executable by a computer to perform the methods of any of claims 21, 39, 43, or 44.

49. The computer network of claim 48, wherein the computer network is a server.

50. The computer network of claim 48, which is an Internet.

* * * * *